United States Patent
Reial et al.

(10) Patent No.: US 12,382,398 B2
(45) Date of Patent: Aug. 5, 2025

(54) REDUCING POWER CONSUMPTION OF A USER EQUIPMENT CONFIGURED FOR DISCONTINUOUS RECEPTION

(71) Applicant: Telefonaktiebolaget LM Ericsson (publ), Stockholm (SE)

(72) Inventors: Andres Reial, Höllviken (SE); Sina Maleki, Malmö (SE); Ali Nader, Malmö (SE); Ilmiawan Shubhi, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 424 days.

(21) Appl. No.: 17/907,752

(22) PCT Filed: Mar. 12, 2020

(86) PCT No.: PCT/EP2020/056728
§ 371 (c)(1),
(2) Date: Aug. 29, 2022

(87) PCT Pub. No.: WO2021/180330
PCT Pub. Date: Sep. 16, 2021

(65) Prior Publication Data
US 2023/0127023 A1    Apr. 27, 2023

(51) Int. Cl.
*H04W 52/02*    (2009.01)
(52) U.S. Cl.
CPC ... *H04W 52/0235* (2013.01); *H04W 52/0232* (2013.01)
(58) Field of Classification Search
CPC ......... H04W 52/0235; H04W 52/0232; H04W 76/28; Y02D 30/70
See application file for complete search history.

(56) References Cited

U.S. PATENT DOCUMENTS

2019/0297577 A1* 9/2019 Lin ................... H04W 52/0229
2020/0037396 A1* 1/2020 Islam ................ H04W 52/0229
(Continued)

OTHER PUBLICATIONS

Sony, "Power saving techniques for NR", R1-1902186, 3GPP TSG RAN WG1 #96, Athens, Greece. Feb. 25-Mar. 1, 2019 (Year: 2019).*

(Continued)

*Primary Examiner* — Ayaz R Sheikh
*Assistant Examiner* — David Zhijun Sun
(74) *Attorney, Agent, or Firm* — COATS & BENNETT, PLLC

(57) ABSTRACT

An access node (110) configures a User Equipment, UE (105), with a power saving monitoring pattern, and subsequently transmits a power saving signal configured to switch the UE (105) from monitoring a downlink in accordance with a connected mode discontinuous reception, C-DRX, monitoring pattern to monitoring the downlink in accordance with the power saving monitoring pattern. For each of the monitoring patterns, monitoring the downlink in accordance with the monitoring pattern comprises monitoring the downlink only when a monitoring opportunity of the monitoring pattern is concurrent with a scheduled active interval of a C-DRX configuration of the UE (105). For any C-DRX cycle of the C-DRX configuration, the monitoring of the downlink in accordance with the power saving monitoring pattern has a shorter monitoring duration than the monitoring of the downlink in accordance with the C-DRX monitoring pattern. The UE (105) correspondingly receives the power saving signal and switches how it monitors the downlink accordingly.

26 Claims, 10 Drawing Sheets

(56) References Cited

U.S. PATENT DOCUMENTS

2020/0154295 A1* 5/2020 Lin .................. H04W 24/08
2022/0150834 A1* 5/2022 Li ................... H04W 52/02

OTHER PUBLICATIONS

Huawei et al., "Discussion on the impact of DCI-based power saving adaptation", 3GPP TSG-RAN2 Meeting #105bis, Xian, China, Apr. 8, 2019, pp. 1-3, R2-1904968, 3GPP.
CMCC, "Discussion on UE power saving schemes with adaption to UE traffic", 3GPP TSG RAN WG1 #96, Athens, Greece, Feb. 25, 2019, pp. 1-14, R1-1903344, 3GPP.

* cited by examiner

350 —

CONFIGURING THE UE WITH A POWER SAVING MONITORING PATTERN
360

TRANSMITTING A POWER SAVING SIGNAL CONFIGURED TO SWITCH THE UE FROM MONITORING THE DOWNLINK IN ACCORDANCE WITH A C-DRX MONITORING PATTERN TO MONITORING THE DOWNLINK IN ACCORDANCE WITH THE POWER SAVING MONITORING PATTERN
370

WHEREIN, FOR EACH OF THE MONITORING PATTERNS, MONITORING THE DOWNLINK IN ACCORDANCE WITH THE MONITORING PATTERN COMPRISES MONITORING THE DOWNLINK ONLY WHEN A MONITORING OPPORTUNITY OF THE MONITORING PATTERN IS CONCURRENT WITH A SCHEDULED ACTIVE INTERVAL OF A C-DRX CONFIGURATION OF THE UE
380

WHEREIN, FOR ANY C-DRX CYCLE OF THE C-DRX CONFIGURATION, THE MONITORING OF THE DOWNLINK IN ACCORDANCE WITH THE POWER SAVING MONITORING PATTERN HAS A SHORTER MONITORING DURATION THAN THE MONITORING OF THE DOWNLINK IN ACCORDANCE WITH THE C-DRX MONITORING PATTERN
390

FIG. 5

```
┌─────────────────────────────────────────────────────┐
│  RECEIVING, FROM AN ACCESS NODE, INFORMATION THAT   │
│ CONFIGURES THE UE WITH A POWER SAVING MONITORING    │
│   PATTERN 250 CONSISTING OF MONITORING              │
│   OPPORTUNITIES SCHEDULED TO OCCUR ONLY DURING      │
│   SCHEDULED ONDURATION INTERVALS OF A               │
│            C-DRX CONFIGURATION OF THE UE            │
│                        410                          │
└─────────────────────────────────────────────────────┘
                         │
                         ▼
┌─────────────────────────────────────────────────────┐
│   RESPONSIVE TO RECEIVING A POWER SAVING SIGNAL     │
│   FROM THE ACCESS NODE, SWITCHING FROM MONITORING   │
│   THE DOWNLINK IN ACCORDANCE WITH A C-DRX           │
│   MONITORING PATTERN TO MONITORING THE DOWNLINK     │
│   IN ACCORDANCE WITH THE POWER SAVING               │
│                MONITORING PATTERN                    │
│                        420                          │
└─────────────────────────────────────────────────────┘

400

┌─────────────────────────────────────────────────────┐
│ WHEREIN MONITORING THE DOWNLINK IN ACCORDANCE WITH  │
│ THE C-DRX MONITORING PATTERN COMPRISES MONITORING   │
│ THE DOWNLINK ONLY THROUGHOUT EACH OF THE SCHEDULED  │
│ ONDURATION INTERVALS THAT OCCUR AND NOT MORE THAN   │
│      A THRESHOLD DURATION SUBSEQUENT TO EACH        │
│                        430                          │
└─────────────────────────────────────────────────────┘

┌─────────────────────────────────────────────────────┐
│  WHEREIN MONITORING THE DOWNLINK IN ACCORDANCE      │
│  WITH THE POWER SAVING MONITORING PATTERN COMPRISES │
│  MONITORING THE DOWNLINK ONLY THROUGHOUT THE        │
│          MONITORING OPPORTUNITIES THAT OCCUR        │
│                        440                          │
└─────────────────────────────────────────────────────┘
```

FIG. 7

REDUCING POWER CONSUMPTION OF A USER EQUIPMENT CONFIGURED FOR DISCONTINUOUS RECEPTION

TECHNICAL FIELD

Embodiments of the present disclosure generally relate to the technical field of wireless communication and more particularly to power management of a device configured for Discontinuous Reception (DRX) in a wireless communication network.

BACKGROUND

In wireless communication networks that adhere to the Third Generation Partnership Project (3GPP) Long Term Evolution (LTE) standard, a User Equipment (UE) can spend significant power to monitor a search space (SS) for the Physical Downlink Control Channel (PDCCH). For example, according to traditional approaches, the UE may need to perform blind detection in its configured control resource sets (CORESETs) to identify whether a PDCCH has been sent to the UE and act accordingly. A CORESET is a set of physical resources (i.e., a specific area on a downlink resource grid) and a set of parameters that can carry PDCCH Downlink Control Information (DCI). The arrival of a PDCCH may further require the UE to monitor until expiration of an Inactivity Timer (IAT) that is started after the PDCCH is received. Although the UE may be configured with a Discontinuous Reception (DRX) setting that limits the amount of monitoring performed and permits the UE to periodically sleep, the UE may nonetheless waste significant power through frequent periodic monitoring that attempts to detect a PDCCH that is only infrequently transmitted by the network. Next generation wireless communication standards that adopt aspects of the LTE standard (e.g., New Radio (NR)) may face power management challenges of a similar nature, possibly to a greater degree.

SUMMARY

Embodiments of the present disclosure configure a UE with one or more power saving monitoring patterns that reduce the monitoring duration per C-DRX cycle relative to a traditional C-DRX monitoring pattern.

Particular embodiments of the present disclosure include a method of monitoring a downlink performed by a UE of a wireless communication network. The method comprises, after receiving, from an access node, information that configures the UE with a power saving monitoring pattern, receiving a power saving signal from the access node. The method further comprises, responsive to receiving the power saving signal, switching from monitoring the downlink in accordance with a connected mode discontinuous reception, C-DRX, monitoring pattern to monitoring the downlink in accordance with the power saving monitoring pattern. For each of the monitoring patterns, monitoring the downlink in accordance with the monitoring pattern comprises monitoring the downlink only when a monitoring opportunity of the monitoring pattern is concurrent with a scheduled active interval of a C-DRX configuration of the UE. For any C-DRX cycle of the C-DRX configuration, the monitoring of the downlink in accordance with the power saving monitoring pattern has a shorter monitoring duration than the monitoring of the downlink in accordance with the C-DRX monitoring pattern.

In some embodiments, monitoring opportunities of the power saving monitoring pattern are concurrent with scheduled active intervals of the C-DRX configuration exclusively during onDuration intervals of the scheduled active intervals.

In some such embodiments, monitoring opportunities of the power saving monitoring pattern are concurrent with scheduled active intervals of the C-DRX configuration exclusively throughout an entirety of each of the onDuration intervals.

In other such embodiments, monitoring opportunities of the power saving monitoring pattern are concurrent with scheduled active intervals of the C-DRX configuration exclusively throughout an initial part of each of the onDuration intervals.

In other such embodiments, monitoring opportunities of the power saving monitoring pattern are concurrent with scheduled active intervals of the C-DRX configuration exclusively throughout a final part of each of the onDuration intervals.

In other such embodiments, monitoring opportunities of the power saving monitoring pattern are concurrent with scheduled active intervals of the C-DRX configuration exclusively throughout a plurality of non-adjacent parts of each of the onDuration intervals.

In other such embodiments, monitoring opportunities of the power saving monitoring pattern are concurrent with scheduled active intervals of the C-DRX configuration exclusively throughout a middle part of each of the onDuration intervals, wherein each middle part is non-adjacent to a start and an end of the onDuration interval.

In other embodiments, the method further comprises at least one of the monitoring opportunities of the power saving monitoring pattern is concurrent with an inactivity timer interval after an onDuration interval of a corresponding scheduled active interval.

In some embodiments, the scheduled active intervals of the C-DRX configuration of the UE that are concurrent with monitoring opportunities of the power saving monitoring pattern are sequentially ordered, at least one intervening scheduled active interval is scheduled to periodically occur between sequential pairs of the scheduled active intervals that are concurrent with monitoring opportunities of the power saving monitoring pattern, and none of the monitoring opportunities of the power saving monitoring pattern are scheduled to occur during any of the intervening scheduled active intervals.

In some embodiments at least one of the monitoring opportunities of the C-DRX monitoring pattern is scheduled to occur non-concurrently to the scheduled active intervals of the C-DRX configuration.

In some embodiments, the method further comprises, in response to the power saving signal, switching back to monitoring the downlink in accordance with C-DRX monitoring pattern upon expiration of a timer. In some such embodiments, the timer is a bandwidth part (BWP) timer and the method further comprises switching which BWP of a plurality of BWPs is active for the downlink upon the expiration.

In other embodiments, the method further comprises, responsive to receiving a further signal from the access node after receiving the power saving signal, switching back to monitoring the downlink in accordance with the C-DRX monitoring pattern.

In some embodiments, the method further comprises receiving, from the access node, further information that configures the UE with a further power saving monitoring pattern, and responsive to receiving a further power saving signal from the access node after receiving the further information and the power saving signal, switching from monitoring the downlink in accordance with the power saving monitoring pattern to monitoring the downlink in accordance with the further power saving monitoring pattern.

In some embodiments, receiving the power saving signal comprises receiving the power saving signal in Downlink Control Information (DCI) while monitoring in accordance with the C-DRX monitoring pattern.

In some embodiments, receiving the power saving signal comprises receiving the power saving signal responsive to transmitting a low battery notification to the access node.

In other embodiments, receiving the power saving signal comprises receiving the power saving signal responsive to transmitting, to the access node, UE assistance information comprising an indication that the UE has a low battery status. In some such embodiments, the indication that the UE (105) has a low battery status is comprised in a Power Preference indication of the UE assistance information. In other such embodiments, the indication that the UE (105) has a low battery status is comprised in an Overheating Assistance indication of the UE assistance information.

In some embodiments, the method further comprises receiving the power saving signal comprises receiving the power saving signal responsive to transmitting a request, to the access node, requesting the switch from monitoring the downlink in accordance with the C-DRX monitoring pattern to monitoring the downlink in accordance with the power saving monitoring pattern.

In some embodiments, the information that configures the UE (105) with the power saving monitoring pattern further configures the UE with the power saving monitoring pattern for use with a Primary Cell (PCell).

In some embodiments, the information that configures the UE (105) with the power saving monitoring pattern further configures the UE (105) with the power saving monitoring pattern for use with a Secondary Cell (SCell). In some such embodiments, the information that configures the UE with the power saving monitoring pattern further configures the UE with the power saving monitoring pattern for use with a further SCell.

In some embodiments, the information configuring the UE with the power saving monitoring pattern further configures the UE with the power saving monitoring pattern for use with either a PCell or an SCell, and the method further comprises receiving further information that configures the UE with a different power saving monitoring pattern for use with the other of the PCell and the SCell. In some such embodiments, the method further comprises, after receiving the information configuring the UE with the different power saving monitoring pattern, receiving a further power saving signal configured to switch the UE to monitoring the downlink of the corresponding PCell or SCell in accordance with the different power saving monitoring pattern.

In some embodiments, the method further comprises, for each of the PCell and the SCell, receiving other information configuring the UE with a corresponding set of two or more power saving monitoring patterns, one of the sets comprising the power saving monitoring pattern and the other of the sets comprising the different power saving monitoring pattern.

Other embodiments of the present disclosure include a method of configuring a UE to monitor a downlink performed by an access node of a wireless communication network. The method comprises, after configuring the UE with a power saving monitoring pattern, transmitting a power saving signal configured to switch the UE from monitoring the downlink in accordance with a connected mode discontinuous reception, C-DRX, monitoring pattern to monitoring the downlink in accordance with the power saving monitoring pattern. For each of the monitoring patterns, monitoring the downlink in accordance with the monitoring pattern comprises monitoring the downlink only when a monitoring opportunity of the monitoring pattern is concurrent with a scheduled active interval of a C-DRX configuration of the UE. For any C-DRX cycle of the C-DRX configuration, the monitoring of the downlink in accordance with the power saving monitoring pattern has a shorter monitoring duration than the monitoring of the downlink in accordance with the C-DRX monitoring pattern.

In some embodiments, the monitoring opportunities of the power saving monitoring pattern are concurrent with scheduled active intervals of the C-DRX configuration exclusively during onDuration intervals of the scheduled active intervals.

In some such embodiments, monitoring opportunities of the power saving monitoring pattern are concurrent with scheduled active intervals of the C-DRX configuration exclusively throughout an entirety of each of the onDuration intervals.

In other such embodiments, monitoring opportunities of the power saving monitoring pattern are concurrent with scheduled active intervals of the C-DRX configuration exclusively throughout an initial part of each of the onDuration intervals.

In other such embodiments, monitoring opportunities of the power saving monitoring pattern are concurrent with scheduled active intervals of the C-DRX configuration exclusively throughout a final part of each of the onDuration intervals.

In other such embodiments, monitoring opportunities of the power saving monitoring pattern are concurrent with scheduled active intervals of the C-DRX configuration exclusively throughout a plurality of non-adjacent parts of each of the onDuration intervals.

In other such embodiments, monitoring opportunities of the power saving monitoring pattern are concurrent with scheduled active intervals of the C-DRX configuration exclusively throughout a middle part of each of the onDuration intervals, wherein each middle part is non-adjacent to a start and an end of the onDuration interval.

In other embodiments, at least one of the monitoring opportunities of the power saving monitoring pattern is concurrent with an inactivity timer interval after an onDuration interval of a corresponding scheduled active interval.

In some embodiments, the scheduled active intervals of the C-DRX configuration of the UE that are concurrent with monitoring opportunities of the power saving monitoring pattern are sequentially ordered, at least one intervening scheduled active interval is scheduled to periodically occur between sequential pairs of the scheduled active intervals that are concurrent with monitoring opportunities of the power saving monitoring pattern, and none of the monitoring opportunities of the power saving monitoring pattern are scheduled to occur during any of the intervening scheduled active intervals.

In some embodiments, at least one of the monitoring opportunities of the C-DRX monitoring pattern is scheduled to occur non-concurrently to the scheduled active intervals of the C-DRX configuration.

In some embodiments, the power saving signal is further configured to switch the UE back to monitoring the downlink in accordance with C-DRX monitoring pattern upon expiration of a timer. In some such embodiments, the timer is a bandwidth part (BWP) timer configured to trigger the UE to switch which BWP of a plurality of BWPs is active for the downlink upon the expiration.

In some embodiments, the method further comprises transmitting, after the power saving signal, a further signal configured to switch the UE back to monitoring the downlink in accordance with the C-DRX monitoring pattern.

In some embodiments, the method further comprises configuring the UE with a further power saving monitoring pattern, and after configuring the UE with the further power saving monitoring pattern and transmitting the power saving signal, transmitting a further power saving signal configured to switch the UE from monitoring the downlink in accordance with the power saving monitoring pattern to monitoring the downlink in accordance with the further power saving monitoring pattern.

In some embodiments, transmitting the power saving signal comprises transmitting the power saving signal in Downlink Control Information (DCI) for reception by the UE (105) while the UE (105) is monitoring in accordance with the C-DRX monitoring pattern.

In some embodiments, transmitting the power saving signal comprises transmitting the power saving signal responsive to having no data to send to the UE.

In other embodiments, transmitting the power saving signal comprises transmitting the power saving signal responsive to having no data that has a latency requirement to send to the UE.

In yet other embodiments, transmitting the power saving signal comprises transmitting the power saving signal responsive to having less than a threshold amount of data to send to the UE.

In still yet other embodiments, transmitting the power saving signal comprises transmitting the power saving signal responsive to receiving a low battery notification from the UE.

In yet other embodiments, transmitting the power saving signal comprises transmitting the power saving signal responsive to receiving, from the UE, UE assistance information comprising an indication that the UE has a low battery status. In some such embodiments, the indication that the UE has a low battery status is comprised in a Power Preference indication of the UE assistance information. In other such embodiments, the indication that the UE has a low battery status is comprised in an Overheating Assistance indication of the UE assistance information.

In some embodiments, transmitting the power saving signal comprises transmitting the power saving signal responsive to receiving a request from the UE requesting the switch from monitoring the downlink in accordance with the C-DRX monitoring pattern to monitoring the downlink in accordance with the power saving monitoring pattern.

In some embodiments, configuring the UE with the power saving monitoring pattern comprises configuring the UE with the power saving monitoring pattern for use with a Primary Cell (PCell).

In some embodiments, configuring the UE with the power saving monitoring pattern comprises configuring the UE with the power saving monitoring pattern for use with a Secondary Cell (SCell). In some such embodiments, configuring the UE with the power saving monitoring pattern further comprises configuring the UE with the power saving monitoring pattern for further use with a further SCell.

In some embodiments, configuring the UE with the power saving monitoring pattern comprises configuring the UE with the power saving monitoring pattern for use with either a PCell or an SCell, and the method further comprises configuring the UE with a different power saving monitoring pattern for use with the other of the PCell and the SCell. In some such embodiments, the method further comprises, after configuring the UE with the different power saving monitoring pattern, transmitting a further power saving signal configured to switch the UE to monitoring the downlink of the corresponding PCell or SCell in accordance with the different power saving monitoring pattern. In some such embodiments, the method further comprises, for each of the PCell and the SCell, configuring the UE with a corresponding set of two or more power saving monitoring patterns, one of the sets comprising the power saving monitoring pattern and the other of the sets comprising the different power saving monitoring pattern.

Other embodiments include a UE. The UE is configured to, after receiving, from an access node, information that configures the UE with a power saving monitoring pattern, receive a power saving signal from the access node. The UE is further configured to, responsive to receiving the power saving signal, switch from monitoring the downlink in accordance with a connected mode discontinuous reception, C-DRX, monitoring pattern to monitoring the downlink in accordance with the power saving monitoring pattern. For each of the monitoring patterns, monitoring the downlink in accordance with the monitoring pattern comprises monitoring the downlink only when a monitoring opportunity of the monitoring pattern is concurrent with a scheduled active interval of a C-DRX configuration of the UE. For any C-DRX cycle of the C-DRX configuration, the monitoring of the downlink in accordance with the power saving monitoring pattern has a shorter monitoring duration than the monitoring of the downlink in accordance with the C-DRX monitoring pattern.

In some embodiments, the UE is further configured to perform any of the UE methods above.

In some embodiments, the UE comprises interface circuitry configured to exchange signaling with an access node, and to configure the UE as described above, the UE comprises processing circuitry.

Other embodiments include an access node. The access node is configured to, after configuring a UE with a power saving monitoring pattern, transmit a power saving signal configured to switch the UE from monitoring the downlink in accordance with a connected mode discontinuous reception, C-DRX, monitoring pattern to monitoring the downlink in accordance with the power saving monitoring pattern. For each of the monitoring patterns, monitoring the downlink in accordance with the monitoring pattern comprises monitoring the downlink only when a monitoring opportunity of the monitoring pattern is concurrent with a scheduled active interval of a C-DRX configuration of the UE. For any C-DRX cycle of the C-DRX configuration, the monitoring of the downlink in accordance with the power saving monitoring pattern has a shorter monitoring duration than the monitoring of the downlink in accordance with the C-DRX monitoring pattern.

In some embodiments, the access node is further configured to perform any of the access node methods above.

In some embodiments, the access node comprises interface circuitry configured to exchange signaling with a UE, and to configure the access node as described above, the access node comprises processing circuitry.

Yet other embodiments include corresponding computer programs comprising instructions which, when executed on processing circuitry of a UE or access node, cause the processing circuitry to carry out the method according to any one of the UE methods or access node methods described above.

Yet other embodiments include carriers containing the computer programs described above, wherein the carrier is one of an electronic signal, optical signal, radio signal, or computer readable storage medium.

Yet other embodiments may include any of the embodiments described above, further comprising any of the relevant features to be described in greater detail below.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a power saving monitoring pattern 250, generally, as opposed to discussion of particular instances of power saving monitoring patterns 250a, 250b, 250c, 250d, 250e, 250f, and/or 250g, or discussion of collections of power saving monitoring patterns 250a-g).

FIG. 5 is a flow diagram illustrating an example method implemented by an access node, according to one or more embodiments of the present disclosure.

FIG. 7 is a flow diagram illustrating an example method implemented by a UE, according to one or more embodiments of the present disclosure.

DETAILED DESCRIPTION

Figure 1:
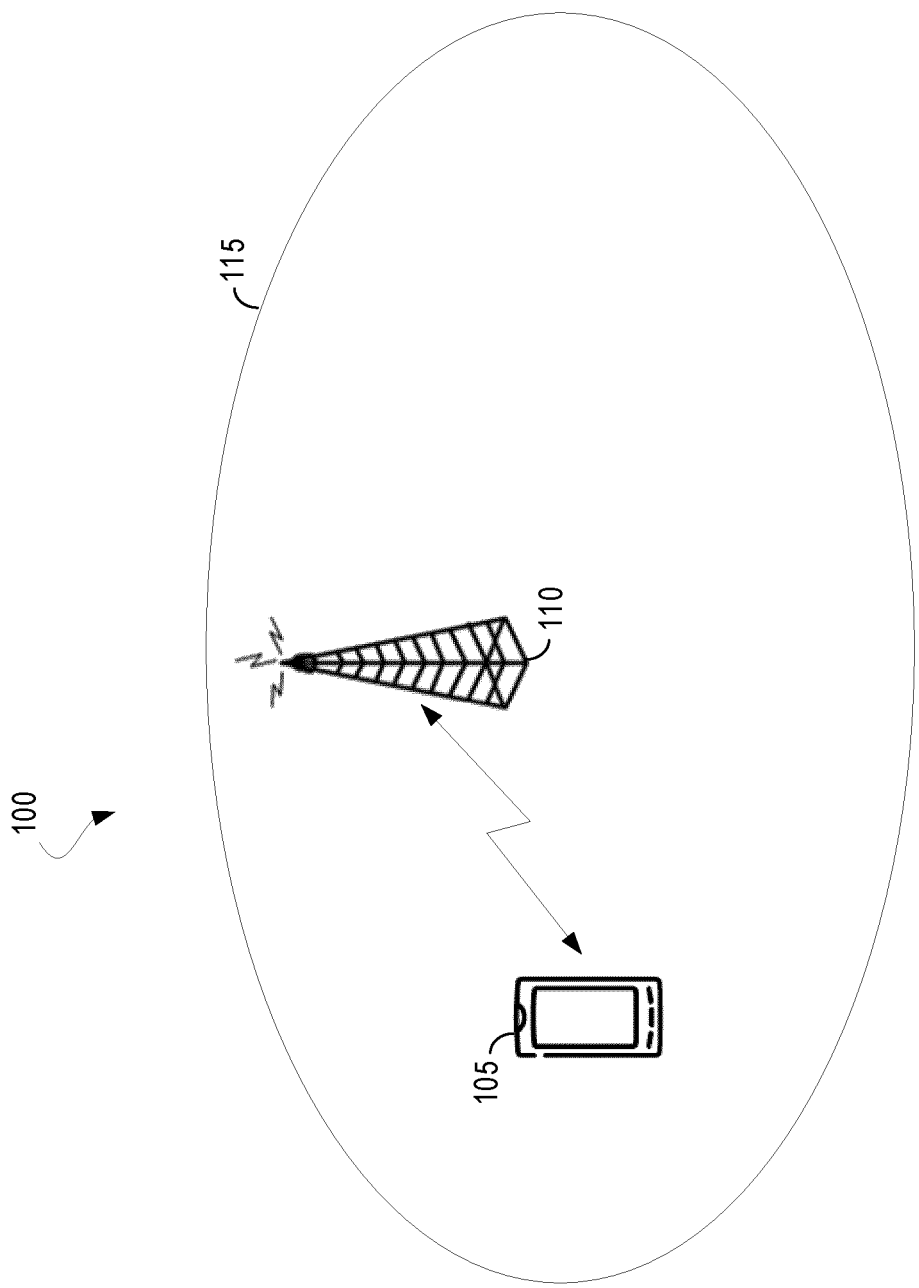
FIG. 1 is a schematic illustrating an example wireless network environment, according to one or more embodiments of the present disclosure.

FIG. 1 illustrates an example communication system 100 according to one or more embodiments of the present disclosure. Although certain aspects of the communication system 100 may herein be described in the context of an LTE, Fifth Generation (5G), and/or NR communication network, the discussion throughout this disclosure may similarly be applied to any of these wireless communication systems, other wireless communication systems (e.g., W-Fi), and/or combinations thereof.

The communication system 100 comprises a plurality of wireless communication nodes. One of the wireless communication nodes in particular is an access node 110 that serves a cell 115 to a UE 105. The UE 105 and/or access node 110 may, in some embodiments, each be referred to as a radio node (i.e., a network node capable of radio communication). Further, the access node 110 may be referred to, in some embodiments, as a base station (such as an eNB, gNB), for example. Although only one access node 110 and one UE 105 are illustrated in FIG. 1, other examples of the communication system 100 may include any number of access nodes 110, each of which may serve one or more cells 115 to any number of UEs 105. Further, according to other embodiments, the UE 105 may, instead, be a base station (e.g., a femtocell, relay base station).

Wireless communication between the access node 110 and one or more UEs 105 is performed using radio resources across a time domain, a frequency domain, or both. LTE and NR in particular use OFDM in the downlink. The basic NR or LTE downlink physical resource may be viewed as a time-frequency grid, as illustrated in FIG. 2.

Figure 2:
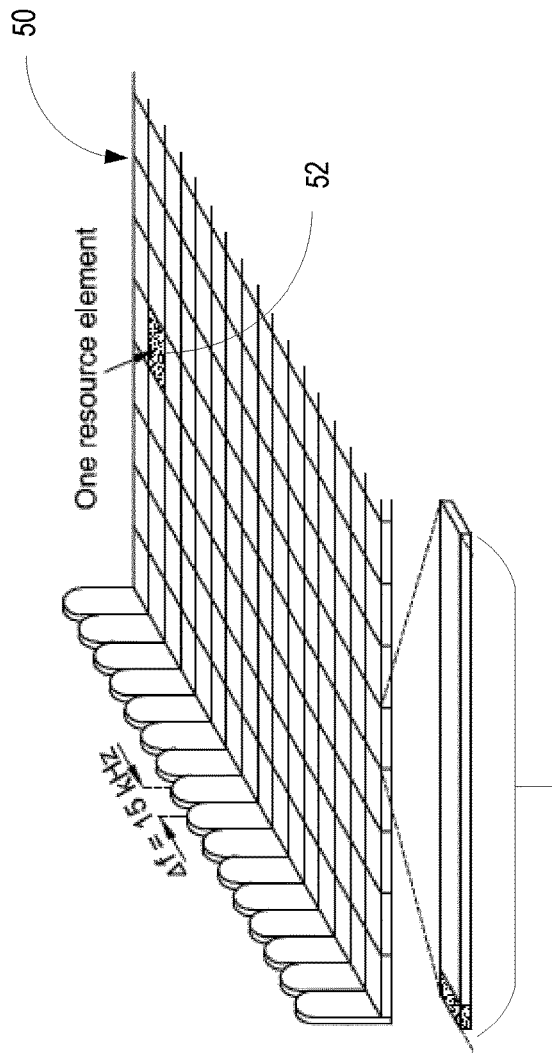
FIG. 2 is a schematic illustrating an example time-frequency grid of radio resources, according to one or more embodiments of the present disclosure.

FIG. 2 illustrates a portion of an example OFDM time-frequency grid 50, e.g., for LTE and/or NR. Generally speaking, the time-frequency grid 50 is divided into sub-frames, as will be discussed below. Each subframe includes a plurality of OFDM symbols 55. Each symbol 55 may include a cyclic prefix. The cyclic prefix may be longer or shorter based on conditions. For example, a normal cyclic prefix (CP) length may be used in situations in which multipath dispersion is not expected to be severe. Alternatively, an extended cyclic prefix may be used in situations in which multipath dispersion is expected to be severe. In general, a subframe may comprise fewer symbols 55 when longer cyclic prefixes are used, and more symbols 55 when shorter cyclic prefixes are used.

According to the present example, the physical resources shown in FIG. 2 are divided across the frequency domain into adjacent subcarriers with a spacing of 15 kHz. Other embodiments may include other spacing (i.e., different in the time domain, in the frequency domain, or both). In particular, the number of subcarriers may, in some embodiments, vary according to the allocated system bandwidth. The smallest element of the time-frequency grid 50 is typically referred to as a resource element 52, which comprises one OFDM subcarrier during one OFDM symbol interval.

Figure 3:
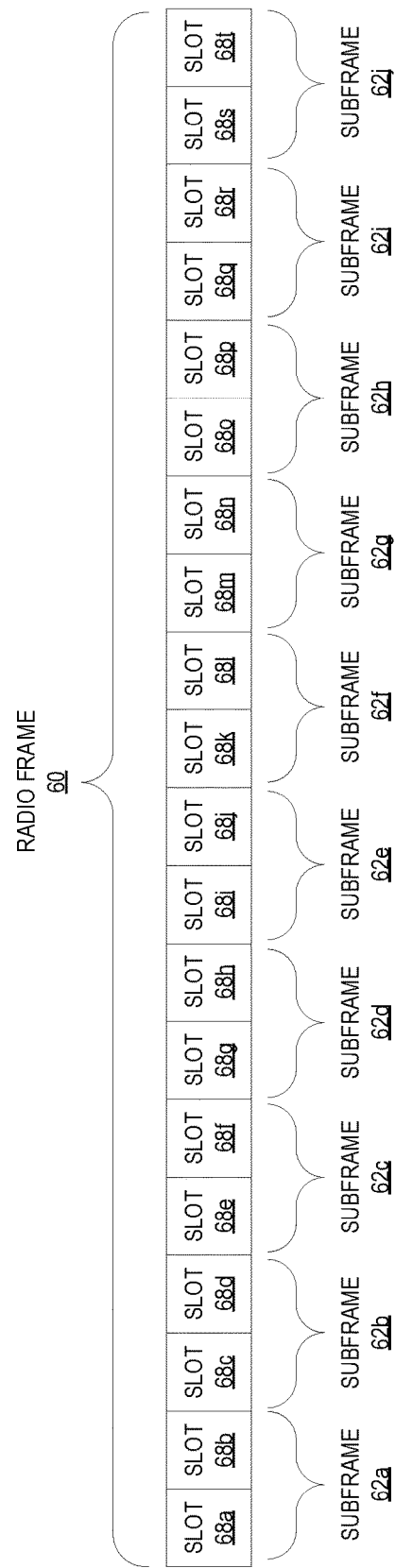
FIG. 3 is a schematic block diagram illustrating an example radio frame, according to one or more embodiments of the present disclosure.

Data is transmitted from the access node 110 to the UE 105 over a downlink transport channel. The downlink transport channel is a time and frequency multiplexed channel shared by a plurality of UEs 105. The downlink transmissions are typically organized into radio frames 60 of a given duration (e.g., ten milliseconds). Each radio frame 60 may comprise a plurality of subframes 62. According to one example, a radio frame 60 may comprise ten equally-sized subframes 62a-j, as shown in FIG. 3. Each subframe 62 may comprise one or more slots 68. For example, as shown in FIG. 3, a subframe 62a may comprise two equally-sized slots 68a-b. In particular, FIG. 3 illustrates an example in which the radio frame 60 comprises twenty equally-sized slots 68a-t.

According to embodiments, a slot 68 may comprise a plurality of symbols 55, the precise number of which may vary according to the embodiment. For example, a slot 68 may comprise seven or fourteen symbols 55, according to particular embodiments. Further, in some embodiments, the slot duration may be configurable, such that the number of symbols 55 in a slot 68 may, e.g., be set in the UE 105 by the access node 110. Further still, a plurality of symbols 55 fewer than the number of symbols in a slot 68 may be referred to, in some embodiments, as a mini-slot (not shown).

PDCCHs may be used, e.g., in NR for downlink control information (DCI). This DCI may, e.g., include downlink scheduling assignments and uplink scheduling grants. The PDCCHs are traditionally transmitted at the beginning of a slot 68 (e.g., in an area of the grid identified as a CORESET) and relate to data in the same or a later slot. For mini-slots, a PDCCH may also be transmitted within a regular slot. Different formats (e.g., sizes) of the PDCCHs are possible to handle different DCI payload sizes and different aggregation levels (i.e. a given code rate for a given payload size).

According to embodiments, a UE 105 is configured to blindly monitor a search space for a PDCCH, and upon detecting a valid DCI message, the UE 105 receives the corresponding downlink data and/or transmits in the uplink in accordance with the DCI. Although the blind decoding process may come at a cost (e.g., sometimes requiring the UE 105 to spend power to monitor during occasions in which no PDCCH is present), this blind decoding may enable flexible scheduling of downlink assignments and/or uplink grants.

A PDCCH-based power saving signal may be used as a technique to improve UE power consumption. Such a signal may, for example, be associated with conventional Connected mode DRX (C-DRX) (i.e., DRX in the RRC_CONNECTED state). PDDCH based Wake-Up-Signaling (WUS) is an example of a PDCCH-based power saving signal that is generally expected to be particularly efficient.

The general idea of WUS is to signal the UE 105 before the ON duration of C-DRX when the network would like to wake up the UE 105 for that ON duration. Upon detection of the WUS, the UE 105 may be required to wake up and monitor a search space for the PDCCH in the next ON duration, for example. While the high-level concept of WUS seems promising, details regarding PDDCH-based WUS remain to be defined. Accordingly, it is currently uncertain how the general idea of WUS discussed above may be applied in a practical sense to new or existing standards.

The NR standard in 3GPP is currently being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, the addition of mini-slot transmission is one technique that enables reduced latency (e.g., relative to the slot-based transmission found in LTE). As discussed above, a mini-slot may consist of any number of OFDM symbols less than those in the corresponding slot. It should be noted that the concepts of slot and mini-slot are not specific to a specific service, meaning that a mini-slot may be used for either eMBB, URLLC, or other services.

To improve UE power utilization, Rel-15 NR implements a Media Access Control (MAC) Control Element (CE)- based Go-To-Sleep (GTS) function. According to traditional GTS functionality, the gNB (i.e., a Fifth Generation (5G)/ NR radio base station) may transmit a MAC CE DRX command to a UE during active time (i.e., during the "onDuration" or while any corresponding IAT is elapsing) indicating that the active time is terminated and the UE may return to "offDuration" until the beginning of the next onDuration. The command is delivered in Physical Downlink Shared Channel (PDSCH) and the UE 105 is required to provide Hybrid Automatic Repeat Request (HARQ) feedback (i.e., acknowledgements (ACKs) and/or negative ACKs (NACKs)) on the PDSCH transmission via the Physical Uplink Control Channel (PUCCH) and/or Physical Uplink Shared Channel (PUSCH).

In Rel-16, the topic of a PDCCH-based power saving signal is colloquially referred to as connected-mode WUS. In connected-mode WUS, a DCI is transmitted on the PDCCH shortly before the beginning of the onDuration. The UE 105 monitors a search space shortly before the onDuration to determine whether onDuration monitoring is necessary. The signal may be configurable with both logical polarities. In particular, it may include the mode where the presence of the WUS signal, or the presence of a certain flag in the payload of the WUS signal, may be interpreted by the UE 105 as indication that onDuration monitoring is not necessary and the UE may return to low-power mode until the next onDuration, effectively providing a flavor of the GTS function.

Notwithstanding, the MAC-CE-based GTS approach (i.e., using a DRX command) as defined in Rel-15 fulfills an important function for UE power savings as it allows the network to indicate to the UE 105 that the UE 105 may return to the low-power state, as the network does not expect any additional data during the rest of the current active time instance. However, the MAC CE-based mechanism comes with a considerable overhead due to the required L1/L2 acknowledgements. The acknowledgement procedures cost both in terms of time to sleep, uplink transmission power for the UE 105, and network resource usage (especially in the uplink).

The GTS flavor of the Rel-16 WUS signal provides a deactivation function with low overhead, but it can only be signaled outside the active time. In practice, the network would transmit the WUS only if it is certain that no data needs to be transmitted during the coming onDuration and, once transmitted, it eliminates the entire onDuration. This is highly limiting for the scheduler since it forces a choice has to be made between either not transmitting any data to the UE 105 to save power or, alternatively, transmitting data and requiring the UE 105 to monitor for a full IAT duration after the PDCCH (which is the dominant UE 105 energy consumption source in eMBB operation). Unless the data is highly delay-insensitive, the choice is typically to require the UE 105 to monitor for the PDCCH, which may cause the UE 105 to incur significant energy consumption (e.g., due to PDCCH monitoring of the full IAT when traffic is bursty).

In view of the above, embodiments of the present disclosure enable the UE 105 to be returned to the low-power state anywhere within the active time window while avoiding a notable signaling overhead and/or delay. Particular embodiments are based on search space switching in which suitably selected search space monitoring pattern sequences allow the UE 105 to be returned to a low-power state at an arbitrary point during the active monitoring time duration. At least some such embodiments are able to provide this functionality using purely downlink layer 1 signaling.

Particular embodiments can be applied to any UE 105 (and particularly an NR UE 105). In some embodiments, one or more criteria are specified with which the network configures the UE 105 with a mechanism to detect and interpret a power saving signal that indicates to the UE 105 that no more PDCCH monitoring is to be performed in current active time. Embodiments further include UE implementation aspects by which the UE can exploit configurations provided by the network to achieve power savings. Accordingly, particular embodiments described herein allow any NR UE 105 (Rel-15 and onwards) in any Rel-15-compliant network deployment to advantageously exploit a low-overhead power saving signal mechanism that can be applied anywhere during active time in order to save additional power (relative to traditional solutions), thus leading to longer UE 105 battery life.

Many of the embodiments described herein provide a power saving signal (e.g., an appropriately configured scheduling DCI in a specific search space) that is transmitted to a UE 105 during the UE's active monitoring time to indicate to the UE 105 that it can stop monitoring for a PDCCH in the current active time and return to low-power mode (e.g., deep sleep) until the next onDuration.

Figure 4:
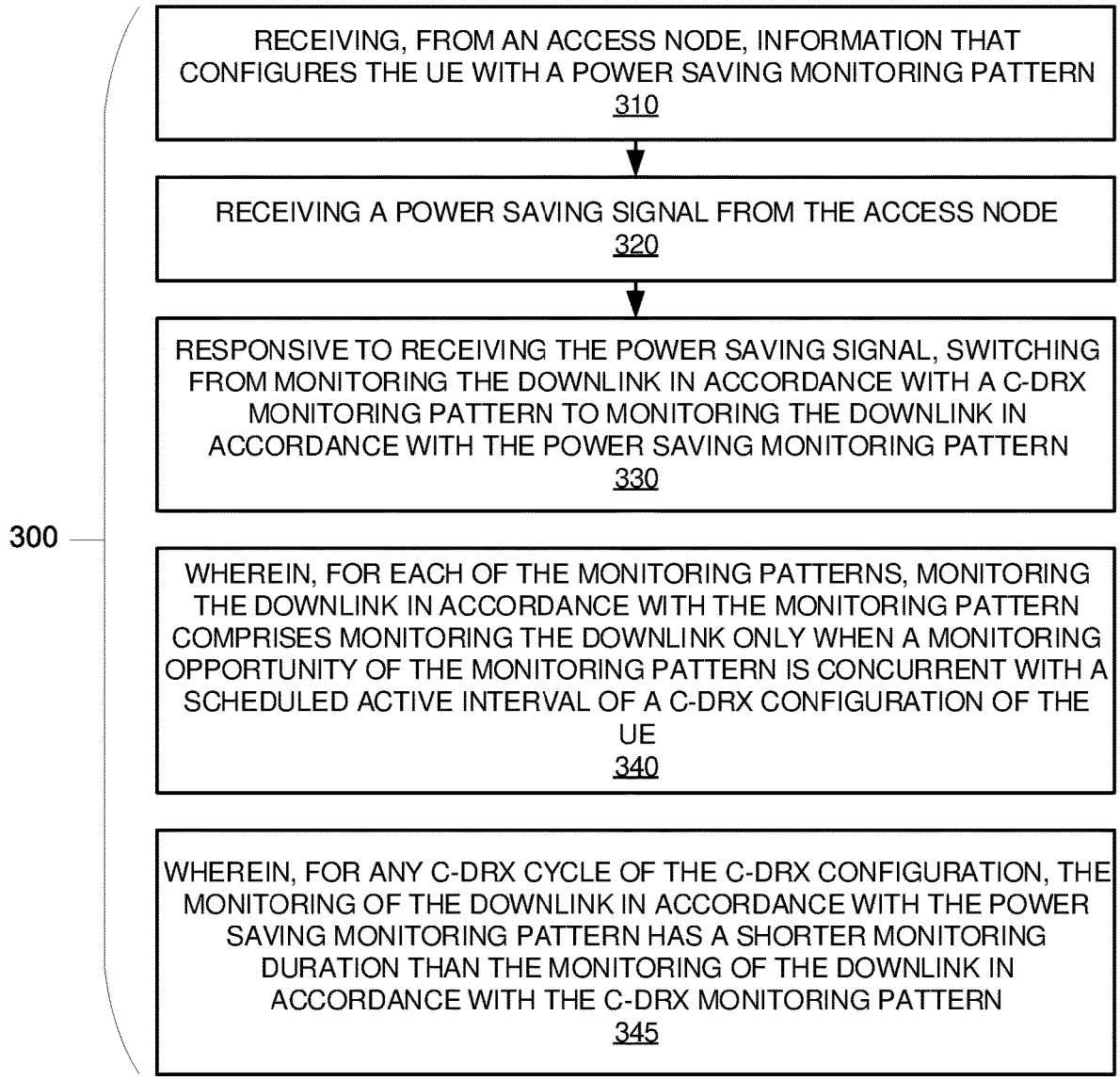
FIG. 4 is a flow diagram illustrating an example method implemented by a UE, according to one or more embodiments of the present disclosure.

At a high level, particular embodiments of the present disclosure include a method 300 of monitoring a downlink performed by a UE 105 of a wireless communication network, as shown in FIG. 4. The method 300 comprises, after receiving, from an access node 110, information that configures the UE 105 with a power saving monitoring pattern (block 310), receiving a power saving signal from the access node 110 (block 320). The method 300 further comprises, responsive to receiving the power saving signal, switching from monitoring the downlink in accordance with a C-DRX monitoring pattern to monitoring the downlink in accordance with the power saving monitoring pattern (block 330). For each of the monitoring patterns, monitoring the downlink in accordance with the monitoring pattern comprises monitoring the downlink only when a monitoring opportunity of the monitoring pattern is concurrent with a scheduled active interval of a C-DRX configuration of the UE 105 (aspect 340). Further, for any C-DRX cycle of the C-DRX configuration, the monitoring of the downlink in accordance with the power saving monitoring pattern has a shorter monitoring duration than the monitoring of the downlink in accordance with the C-DRX monitoring pattern (aspect 345). Other embodiments of the present disclosure correspondingly include a method 350 of configuring a UE 105 to monitor a downlink performed by an access node 110 (e.g., a gNB) of a wireless communication network, as shown in FIG. 5. The method 350 comprises, after configuring the UE 105 with a power saving monitoring pattern (block 360), transmitting a power saving signal configured to switch the UE 105 from monitoring the downlink in accordance with a C-DRX monitoring pattern to monitoring the downlink in accordance with the power saving monitoring pattern (block 370). For each of the monitoring patterns, monitoring the downlink in accordance with the monitoring pattern comprises monitoring the downlink only when a monitoring opportunity of the monitoring pattern is concurrent with a scheduled active interval of a C-DRX configuration of the UE 105 (aspect 380). Further, for any C-DRX cycle of the C-DRX configuration, the monitoring of the downlink in accordance with the power saving monitoring pattern has a shorter monitoring duration than the monitoring of the downlink in accordance with the C-DRX monitoring pattern (aspect 390).

The monitoring patterns define when monitoring opportunities occur. That is, the monitoring patterns define occasions during which a signal or channel of interest (e.g., a PDCCH) may be present within a given search space configured in the UE 105. The UE 105 may be configured with multiple monitoring patterns, and may switch which one or more of them are used, e.g., in response to a signal from the access node 110 and/or other events or conditions that occur. To configure the monitoring patterns in the UE 105, the access node 110 (e.g., a gNB) may, for example, configure the UE 105 with different search spaces associated with the same or different CORESETs. Although this disclosure will focus on the time-domain structure of the search spaces, additional power saving effects may be achieved via frequency domain adaptation.

In one embodiment, the UE 105 is configured with at least one search space having a conventional PDCCH monitoring pattern, e.g., a pattern in which monitoring for a PDCCH is performed in every slot or with some other predetermined duty cycle. As one particular example, the UE 105 may be configured with a pattern of every Nth (e.g., 2nd, 4th) slot of the onDuration of a C-DRX configuration and any IAT interval that occurs after the arrival of data at the UE 105. For purposes of this disclosure, the search space configured to be monitored in accordance with a conventional PDCCH monitoring pattern (e.g., a C-DRX monitoring pattern used with a C-DRX configuration to determine when monitoring is performed) will be referred to as a "monitoring-SS." When variations of monitoring-SS are discussed herein, it should be understood that a corresponding C-DRX configuration and/or C-DRX monitoring pattern may be associated with each variation of monitoring-SS.

The UE 105 is additionally configured with at least one search space that is used in response to receiving a power saving signal. A common feature of search spaces such as these is that during at least most of the C-DRX period there are no corresponding monitoring occasions defined. Indeed, according to many embodiments, there are no monitoring occasions scheduled outside of scheduled onDurations. Several embodiments will be discussed below in which each monitoring opportunity of a power saving monitoring pattern is scheduled to occur exclusively during a scheduled onDuration interval of a corresponding scheduled active interval of the C-DRX configuration. For purposes of this disclosure, a search space corresponding to a power saving monitoring pattern that shortens the total duration of monitoring that would be performed during a given C-DRX cycle relative to monitoring in accordance with a corresponding C-DRX monitoring pattern will be referred to as a "GTS-SS." When variations of GTS-SS are discussed herein, it should be understood that a corresponding power saving monitoring pattern may be associated with each variation of GTS-SS, and more than one or more power saving monitoring patterns may be configured in the UE 105 at a time.

Figure 6A:
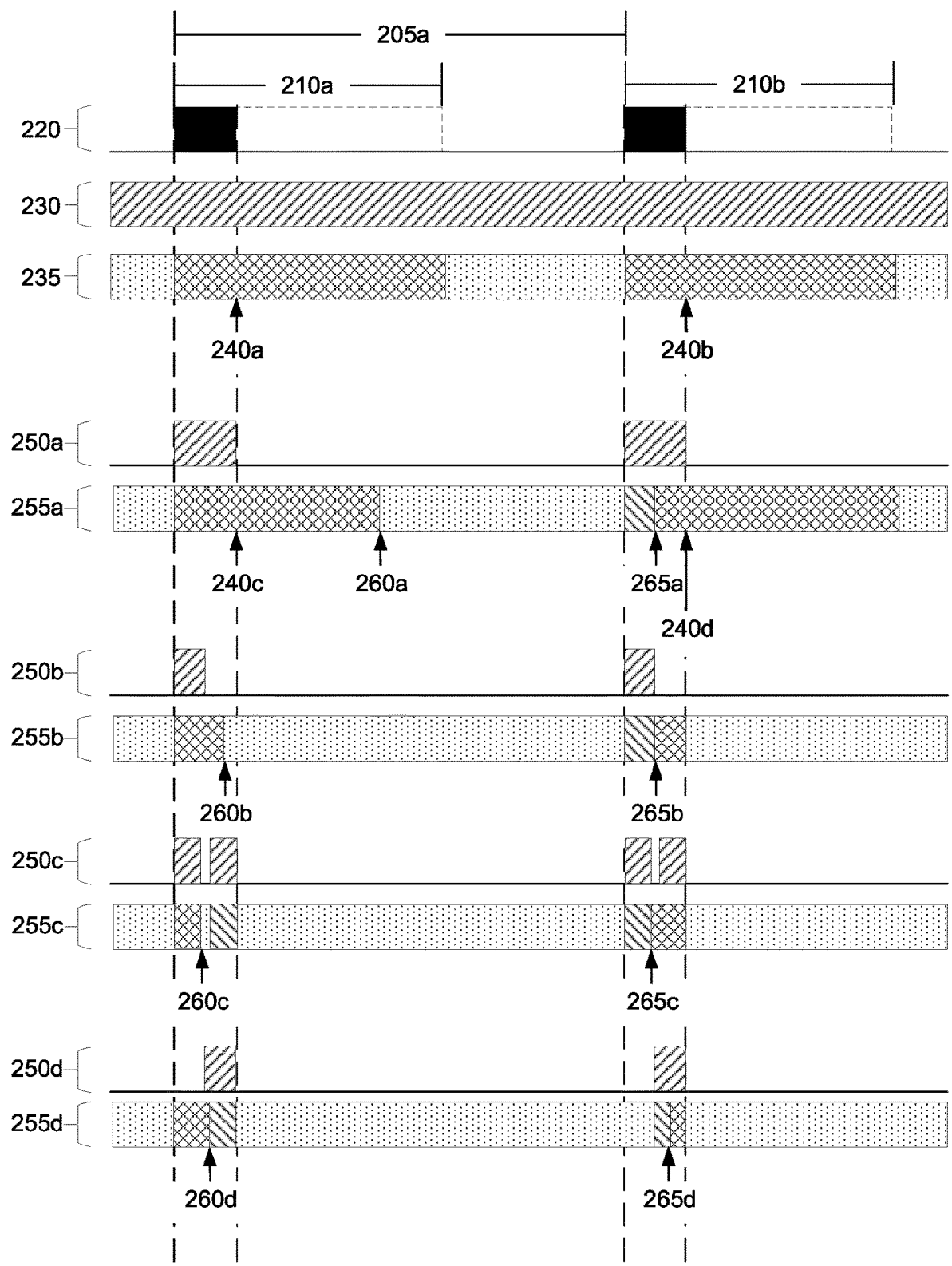
FIGS. 6A and 6B are timing diagrams illustrating example monitoring patterns, according to one or more embodiments of the present disclosure.
Figure 6B:
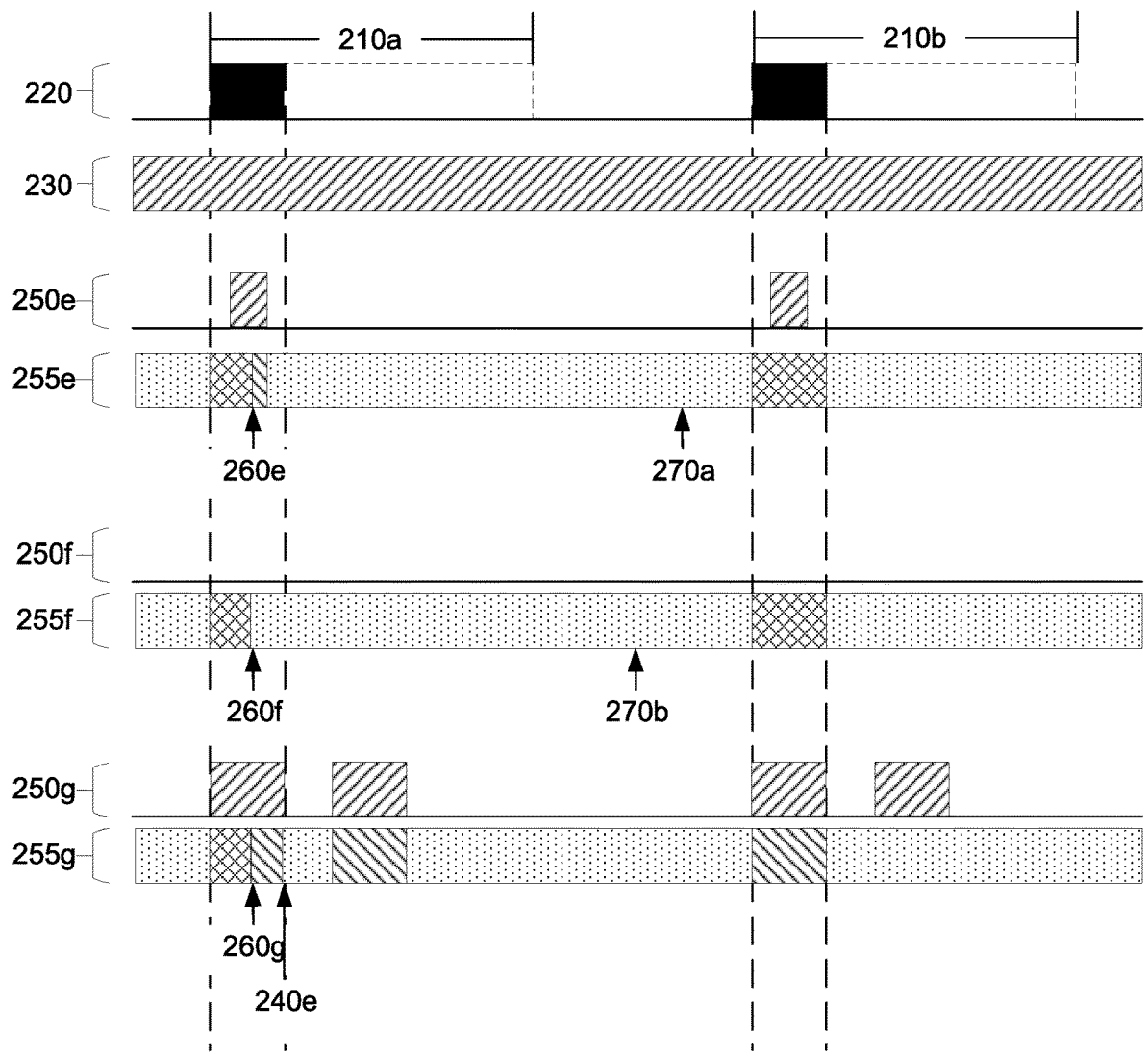

Several examples of how different events and monitoring patterns affect the monitoring performed by the UE 105 are illustrated in FIG. 6A and FIG. 6B. These figures illustrate a variety of example timelines. The timelines each generally depict when certain intervals of time are scheduled to occur. For purposes of clarity with respect to certain concepts below, the individual slots 68, subframes 62, and radio frames 60 that occur during these timelines is omitted from FIG. 6A and FIG. 6B. Notwithstanding, it should be understood that any interval shown on any time therein indicates that a specified event is scheduled or present in one or more consecutive slots 68 within the interval, but such does not imply that said event is scheduled or present within all subunits of those slots (e.g., in each mini-slot or symbol).

Among these timelines, a C-DRX configuration 220 of the UE 105 having a particular C-DRX cycle length 205 is illustrated. Within each C-DRX cycle 205, an active interval 210 of the C-DRX configuration 220 is scheduled. While each scheduled active interval 210 comprises at least a C-DRX onDuration interval starting at a particular time of the C-DRX cycle, each scheduled active interval 210 may or may not comprise a C-DRX IAT interval. Accordingly, the length of each scheduled active interval 210 may vary.

The timelines also show when the monitoring opportunities of a C-DRX monitoring pattern 230 and those of respective power saving monitoring patterns 250a-g are scheduled to occur. Correspondingly, UE-state timelines 235, 255a-g are provided to show the various states of the UE 105 as certain events occur when monitoring in accordance with the C-DRX monitoring pattern 235 and power saving monitoring patterns 250a-g, respectively. As briefly discussed above, for each of the monitoring patterns 230, 250, monitoring the downlink in accordance with the monitoring pattern 230, 250 comprises monitoring the downlink only when a monitoring opportunity of the monitoring pattern 230, 250 is concurrent with a scheduled active interval 210 of a C-DRX configuration 220 of the UE 105.

In the depicted example, the onDurations of the C-DRX configuration 220 are periodic and occur at the start of each scheduled active interval 210. According to these examples, if a PDCCH arrives during any onDuration while the UE 105 is monitoring in accordance with the C-DRX monitoring pattern 230, an IAT interval is started. The duration of the IAT interval is an amount of time that the UE 105 is configured to continue monitoring before the UE 105 may enter a low-power state. Thus, monitoring in accordance with the C-DRX configuration 220 may comprise monitoring at least throughout the onDuration and for not more than a threshold duration thereafter (e.g., in each slot 68 of the onDuration and for a further duration corresponding to the length of the IAT interval). In many embodiments, the threshold duration is signaled to the UE 105 from the access node 110 (e.g., in DCI).

Note that the monitoring opportunities of any monitoring pattern 230, 250a-g may be periodic (e.g., per slot 68), as may be the pattern itself (e.g., per C-DRX cycle). In this particular example, the monitoring-SS is configured for every slot 68. As discussed above, for purposes of clarity, the slot timing is not shown in the examples of FIG. 6A and FIG. 6B. Therefore, while the timeline depicting the monitoring opportunities of the C-DRX monitoring pattern 230 shows a steady block throughout its timeline, this represents a monitoring opportunity of the C-DRX monitoring pattern 230 being scheduled for every slot 68 of the timeline. That is, the C-DRX monitoring pattern 230 of this example comprises monitoring opportunities having a single-slot duty cycle.

To monitor in accordance with the C-DRX monitoring pattern 230, the UE 105 would monitor in each slot 68 in which the UE 105: 1) is active (i.e., according to the C-DRX configuration 220); and 2) has a monitoring opportunity of the C-DRX monitoring pattern 230 scheduled (which reflects the monitoring-SS in which a PDCCH may potentially be found). Thus, UE monitoring in accordance with the monitoring-SS (and C-DRX monitoring pattern 230) can be thought of as occurring during the intersection of the C-DRX configuration 220 timeline and the C-DRX monitoring pattern 230 timeline.

UE-state timeline 235 shows an example of certain states of the UE 105 while monitoring in accordance with a C-DRX monitoring pattern 230. In this example, DCI 240a, 240b are received at the end of respective onDurations of respective scheduled active intervals 210a, 210b. According to the timeline 235, the UE 105 is in a low-power state until the scheduled active interval 210a occurs. In response to the scheduled active interval 210a occurring concurrently with monitoring opportunities of the C-DRX configuration 230, the UE 105 starts monitoring at the beginning of the scheduled active interval 210a (i.e., at the beginning of its onDuration interval). The arrival of the DCI 240a (and, e.g., corresponding data) in the last slot 68 of the onDuration of scheduled active interval 210a extends the scheduled active interval 210a up to a maximum extent that is consistent with this particular C-DRX configuration 220 before the UE 105 is permitted to enter a low-power state. This example shows that, under certain conditions, the UE 105 can potentially spend a significant amount of time active and monitoring, and possibly be significantly limited in its ability to enter a low-power state when monitoring in accordance with the C-DRX monitoring pattern 230.

In view of the above, a GTS-SS may take a variety of different forms, e.g., to enable a reduction in the duration of monitoring performed per C-DRX cycle (and correspondingly, a reduction in UE power consumption) beyond that which can be obtained using the monitoring-SS when monitoring the downlink. Each GTS-SS may significantly alter the timing of monitoring performed by the UE 105 as compared to how the UE 105 would otherwise monitor when the monitoring-SS is used. As shown in FIG. 6A and FIG. 68, the monitoring opportunities of different power saving monitoring patterns 250a-g (reflecting different GTS-SS configurations) and signaling that may be received by the UE 105 from the access node 110, may impact the search space being used and the actual monitoring to be performed by the UE 105, in a variety of ways.

In each of the UE-state timelines 255a-g, the UE 105 begins by monitoring in accordance with the C-DRX monitoring pattern 230 (e.g., which reflects a monitoring-SS timing) by using the C-DRX configuration 220 and certain monitoring opportunities to control when the UE 105 is in the active state and thereby monitor in particular intervals. The UE 105 subsequently switches to monitoring in accordance with a power saving monitoring pattern 250a-g (which reflects a GTS-SS timing) in order to monitor for a reduced duration (or in the case of power saving monitoring pattern 250f, refrain from monitoring entirely) and thereby save power. In this regard, the slots 68 during which the UE 105 monitors in accordance with the power saving monitoring patterns 250a-g may be densely scheduled to occur during scheduled active intervals 210 (and in some embodiments, exclusively during onDurations thereof). However, under each of the power saving monitoring patterns 250a-g, slots 68 in which monitoring is performed are advantageously separated by longer durations of time spent per C-DRX cycle in a low-power state relative to monitoring in accordance with the C-DRX monitoring pattern 230.

In these examples, an appropriate signal is sent from the access node 110 to the UE 105 to configure the UE 105 to switch between using any of these search spaces (e.g., the monitoring-SS and any of the GTS-SSs configured in the UE 105) in order to monitor in accordance with the corresponding monitoring pattern 230, 255a-g configured at the UE 105.

According to a first example GTS-SS, monitoring opportunities of the power saving monitoring pattern 250a are concurrent with scheduled active intervals 210 of the C-DRX configuration 220 exclusively during onDuration intervals of the scheduled active intervals 210. More specifically, according to this particular example, monitoring opportunities of the power saving monitoring pattern 250a are concurrent with scheduled active intervals 210 of the C-DRX configuration 220 exclusively throughout an entirety of each of the onDuration intervals. In this example, the UE 105 switches from monitoring the downlink in accordance with the C-DRX monitoring pattern 230 to monitoring the downlink in accordance with the power saving monitoring pattern 250*a* in response to receiving a power saving signal 260*a* during an IAT interval of scheduled active interval 210*a*. As will be shown in greater detail using further examples below, the UE 105 may also respond to a power saving signal 260 during an onDuration, i.e., using this power saving monitoring pattern 250*a*, or several of the others as will be shown). Monitoring opportunities of the power saving monitoring pattern 250*a* are not provided outside of the onDuration intervals of the C-DRX configuration 220.

Now with reference to the first example UE-state timeline 255*a*, the UE 105 initially monitors according to the C-DRX monitoring pattern 230, which configures the UE 105 to be in an active power state and monitoring during the first scheduled active interval 210*a*. During the onDuration of the first scheduled active interval 210*a*, a DCI 240*c* arrives at the UE 105 on a PDCCH indicating that data is scheduled, thereby causing an IAT interval to commence and a duration of the scheduled active interval 210*a* to be extended beyond the onDuration. During this IAT interval, the UE 105 receives a power saving signal 260*a* that configures the UE 105 to switch to monitoring in accordance with the power saving monitoring pattern 250*a*. Given that a monitoring opportunity is not scheduled according to power saving monitoring pattern 250*a* during the IAT duration of the scheduled active interval 210*a*, the UE 105 stops monitoring and enters a low-power state. The UE 105 then monitors the onDuration of the next scheduled active interval 210*b* without further signaling. According to this example, the UE 105 receives a further signal 265*a* (e.g., a command) from the access node 110 during that next onDuration. The further signal 265*a* configures the UE 105 to switch back to monitoring in accordance with the C-DRX monitoring pattern 230. Consistent with the C-DRX monitoring pattern 230, the UE 105 finishes monitoring throughout the onDuration interval of the scheduled active duration 210*b*, and responsive to receiving a DCI 240*d* and the arrival of corresponding data during this onDuration, the UE 105 monitors into the IAT interval of scheduled active interval 210*b*. Thus, in this example, switching back to monitoring in accordance with the C-DRX configuration 230 permits the UE 105 to monitor the IAT interval of scheduled active intervals 210, whereas monitoring in accordance with power saving monitoring pattern 250*a* does not.

According to a second example GTS-SS, monitoring opportunities of the power saving monitoring pattern 250*b* are concurrent with scheduled active intervals 210 of the C-DRX configuration 220 exclusively throughout an initial part of each of the onDuration intervals. Thus, the monitoring opportunities of the second power saving monitoring pattern 250*b* span less than the entirety of these onDuration intervals. In this example, the UE 105 switches from monitoring the downlink in accordance with the C-DRX monitoring pattern 230 to monitoring the downlink in accordance with the power saving monitoring pattern 250*b* in response to receiving a power saving signal 260*b*. While the example of FIG. 6A shows this power saving signal 260*b* arriving during the onDuration interval of the scheduled active interval 210*a*, the UE 105 may, in some embodiments, similarly switch had the power saving signal 260*b* arrived during a corresponding IAT duration (i.e., if one were present in this example). Monitoring opportunities according to the second power saving monitoring pattern 250*b* are not provided outside of the initial part of the onDuration, in this example.

Now with reference to the second example UE-state timeline 255*b*, the UE 105 initially monitors according to the C-DRX monitoring pattern 230, which configures the UE 105 to be in an active power state and monitoring during the first scheduled active interval 210*a*. Towards the end of this on Duration, the UE 105 receives a power saving signal 240*c* that configures the UE to switch to monitoring in accordance with the second power saving monitoring pattern 260*b*. Given that a monitoring opportunity is not scheduled according to the second power saving monitoring pattern 260*b* during the latter part of the onDuration, the UE 105 stops monitoring and enters a low-power state. The UE 105 then monitors the initial part of the onDuration of the next scheduled active interval 210*b* without further signaling. According to this example, the UE 105 receives a further signal 265*b* from the access node 110 during the initial part of that next onDuration (i.e., during the monitoring opportunity corresponding to scheduled active interval 210*b*). The further signal 265*b* configures the UE 105 to switch back to monitoring in accordance with the C-DRX monitoring pattern 230. Accordingly, the UE 105 continues monitoring throughout the remainder of the onDuration (i.e., the portion of the scheduled active interval 210*b* that is concurrent with the monitoring opportunities of the C-DRX monitoring pattern 230, and not for just the initial part thereof). Although the UE 105 would be permitted to perform PDCCH monitoring during a following IAT interval of the scheduled active interval 210*b*, in this example, no such IAT interval occurs since no DCI 240 arrives during the corresponding onDuration to indicate that data is scheduled for the UE 105. Thus, in this example, the further signal 265*b* that switches the UE 105 back to monitoring in accordance with the C-DRX monitoring pattern 230 may enable the UE 105 to monitor in the final portion (i.e., the remainder) of the onDuration and any following IAT if present.

According to a third example GTS-SS, monitoring opportunities of the power saving monitoring pattern 250*c* are concurrent with scheduled active intervals 210 of the C-DRX configuration 220 exclusively throughout a plurality of non-adjacent parts of each of the onDuration intervals. Thus, the monitoring opportunities of the third power saving monitoring pattern 250*c* form a monitoring gap at least one slot 68 wide during each of these onDuration intervals. In this example, the UE 105 switches from monitoring the downlink in accordance with the C-DRX monitoring pattern 230 to monitoring the downlink in accordance with the power saving monitoring pattern 250*c* in response to receiving a power saving signal 260*c*. While the example of FIG. 6A shows this power saving signal 260*c* arriving during the initial part of the onDuration interval of scheduled active interval 210*a*, the UE 105 may, in some embodiments, similarly switch had the power saving signal 260*c* arrived during a corresponding IAT duration (i.e., if one were present in this example). Monitoring opportunities of the power saving monitoring pattern 250*c* are not provided outside of the onDuration intervals of the C-DRX configuration 220, in this example.

Now with reference to the third example UE-state timeline 255*c*, the UE 105 initially monitors according to the C-DRX monitoring pattern 230, which configures the UE 105 to be in an active power state and monitoring during the first scheduled active interval 210*a*. During one of a plurality of non-adjacent parts of the onDuration (i.e., the initial of such parts, in this example), the UE 105 receives a power saving signal 260c that configures the UE 105 to switch to monitoring in accordance with the third power saving monitoring pattern 250c. Given that monitoring opportunities according to the third power saving monitoring pattern 250c are only scheduled for parts of the onDuration, the UE 105 will enter a low power state during the parts of the onDuration in which no monitoring opportunity of the third power saving monitoring pattern 250c is scheduled. The UE 105 will also enter a low-power state after the last scheduled part of the onDuration until the first scheduled part of the next onDuration without further signaling. According to this example, the UE 105 receives a further signal 265c from the access node 110 during the initial part of that next onDuration (i.e., during a monitoring opportunity in the first part of the onDuration of scheduled active interval 210b). The further signal 265c configures the UE 105 to switch back to monitoring in accordance with the C-DRX monitoring pattern 230. Accordingly, the UE 105 continues monitoring throughout the remainder of the onDuration (i.e., and not for just for parts thereof). Although the UE 105 would be permitted to perform PDCCH monitoring during a following IAT interval of the scheduled active interval 210b, in this example, no such IAT interval occurs since no DCI 240 arrives during the corresponding onDuration.

According to a fourth example GTS-SS, monitoring opportunities of the power saving monitoring pattern 250d are concurrent with scheduled active intervals 210 of the C-DRX configuration 220 exclusively throughout a final part of each of the onDuration intervals. Notwithstanding, other embodiments may include monitoring opportunities that begin or end at any point of the onDuration, e.g., such that the monitoring opportunities per onDuration span less than the onDuration and are non-adjacent to the beginning and/or the end of the onDuration. In this example, the UE 105 switches from monitoring the downlink in accordance with the C-DRX monitoring pattern 230 to monitoring the downlink in accordance with the power saving monitoring pattern 250d in response to receiving a power saving signal 260d. Monitoring opportunities of the power saving monitoring pattern 250c are not provided outside of the onDuration intervals of the C-DRX configuration 220, in this example.

Now with reference to the fourth example UE-state timeline 255d, the UE 105 initially monitors according to the C-DRX monitoring pattern 230, which configures the UE 105 to be in an active power state and monitoring during the first scheduled active interval 210a. During the onDuration, the UE 105 receives a power saving signal 260d that configures the UE 105 to switch to monitoring in accordance with the fourth power saving monitoring pattern 250d. Given that monitoring opportunities according to the fourth power saving monitoring pattern 250d are scheduled for the remainder of the onDuration, the UE 105 will not enter a low power state until after the final part of that onDuration. The UE 105 will remain in that low power state throughout an initial part of the next onDuration since no monitoring opportunity of the fourth power saving monitoring pattern 250d is scheduled at that time. Notwithstanding, the UE 105 will monitor during the final part of that next onDuration without further signaling. According to this example, the UE 105 receives a further signal 265d from the access node 110 during the final part of that next onDuration. The further signal 265d configures the UE 105 to switch back to monitoring in accordance with the C-DRX monitoring pattern 230. Accordingly, the UE 105 continues monitoring throughout the remainder of the on Duration. Although the UE 105 would be permitted to perform PDCCH monitoring during a following IAT interval of the scheduled active interval 210b, in this example, no such IAT interval occurs since no DCI 240 arrives during the corresponding onDuration.

Turning to FIG. 6B, the C-DRX configuration 220 and C-DRX monitoring pattern 230 of FIG. 6A are repeated, e.g., so that monitoring behavior of the UE 105 according to some additional power saving monitoring patterns 250e-g maybe be fairly compared against that of the power saving monitoring patterns 250a-d when the UE 105 similarly switches to and from monitoring in accordance with the C-DRX monitoring pattern 230.

According to a fifth example GTS-SS, monitoring opportunities of the power saving monitoring pattern 250e are concurrent with scheduled active intervals 210 of the C-DRX configuration 220 exclusively throughout a middle part of each of the onDuration intervals. Each middle part is non-adjacent to a start and an end of the onDuration interval. That is, the monitoring opportunities of the fifth power saving monitoring pattern 250e are not adjacent to either the start or the end of their corresponding onDuration intervals. In this particular example, the fifth power saving monitoring pattern 250e is configured to work with a timer (e.g., a timer that starts elapsing responsive to switching to a power saving monitoring pattern 250 and/or switching away from the C-DRX monitoring pattern 230). More particularly, after the UE 105 switches to monitoring in accordance with the fifth power saving monitoring pattern 250e, the UE 105 is configured to switch back to monitoring in accordance with the C-DRX monitoring pattern 230 upon expiration of the timer. Correspondingly, when the UE 105 switches to use the fifth GTS-SS, expiration of the timer controls when the UE 105 reinstates the monitoring-SS.

The timer may have any duration that is appropriate in view of the particular embodiment. For example, the timer duration may be based on a desired period of reduced UE power consumption. In some particular embodiments (e.g., such as the one illustrated in FIG. 6B), the timer is configured to expire before the next onDuration, whereas in other embodiments, the timer is configured to expire after at least one next onDuration occurs.

In particular embodiments, the timer is a bandwidth part (BWP) timer associated with BWP switching. For example, the UE 105 may not only switch back to monitoring in accordance with the C-DRX monitoring pattern 230 upon expiration of the BWP timer, but may also switch which BWP of a plurality of BWPs is active for the downlink. Thus, embodiments include a UE 105 that uses different BWPs for the carrier and monitors those different BWPs using respective monitoring patterns (e.g., 230, 250e).

Now with reference to the fifth UE-state timeline 255e, the UE 105 initially monitors the downlink in accordance with the C-DRX monitoring pattern 230, which configures the UE 105 to be in an active power state and monitoring after an initial part of the onDuration of the first scheduled active interval 210a has elapsed. During the monitoring opportunity in the middle part of this onDuration, the UE 105 receives a power saving signal 260e that configures the UE 105 to switch to monitoring in accordance with the fifth power saving monitoring pattern 250e. The UE 105 continues to monitor in the onDuration until the part of the onDuration that is concurrent with the monitoring opportunities of the fifth power saving monitoring pattern 250e have elapsed, whereupon the UE 105 enters a low-power state. The UE 105 then switches back to monitoring in accordance with the C-DRX monitoring pattern 230 upon expiration of a timer occurs at time 270a. In this example, the timer is a BWP timer that expires before the next onDuration. Accordingly, the UE 105 switches to monitoring according to the C-DRX monitoring pattern 230 before the next on Duration, and monitors the onDuration of scheduled active interval 210*b* without further signaling. Although the UE 105 would be permitted to perform PDCCH monitoring during a following IAT duration, in this example, no IAT duration occurs since no DCI 240 arrives while the UE 105 is monitoring in this example. Notwithstanding, in other examples, the expiration of the timer may enable the UE 105 to monitor not only the next onDuration, but also a following IAT duration when present.

According to a sixth example GTS-SS corresponding to a sixth power saving pattern 250*f*, no monitoring opportunities are scheduled. In this particular example, because no monitoring opportunities are concurrent with any active time interval 210 of the C-DRX configuration 220, monitoring in accordance with the sixth power saving pattern 250*f* causes the UE 105 to refrain from conducting any monitoring of the downlink whatsoever. Since the UE 105 is not monitoring the downlink in this scenario, the UE 105 is configured to switch back to monitoring in accordance with the C-DRX monitoring pattern 230 in response to expiration of a timer (e.g., in similar fashion to the previous example). Thus, when the UE 105 switches to use the sixth GTS-SS, expiration of the timer controls when the UE 105 reinstates the monitoring-SS.

Now with reference to the sixth UE-state timeline 255*f*, the UE 105 initially monitors according to the C-DRX monitoring pattern 230, which configures the UE 105 to be in an active power state and monitoring during the first scheduled active interval 210*a*. During the onDuration, the UE 105 receives a power saving signal 260*f* that configures the UE 105 to switch to monitoring in accordance with the sixth power saving pattern 250*f*. Given that no monitoring opportunities are scheduled according to the sixth power saving pattern 250*f*, the UE 105 stops monitoring and enters a low power state. The UE 105 is configured to reinstate monitoring according to the C-DRX monitoring pattern 230 upon expiration of a timer (i.e., at time 270*b*, in this example). As in the previous example, the timer may be a BWP timer. As previously discussed, the timer may be configured to expire before the next onDuration (as in FIG. 6B) or after one or more subsequent onDurations. In this example, responsive to receiving the power saving signal 260*f*, the UE 105 enters the low-power state, switches back to monitoring according to the C-DRX monitoring pattern 230 before the next onDuration, and monitors the next onDuration without further signaling.

It should be noted that the monitoring opportunities of a power saving monitoring pattern 250 are not limited to occurring within onDuration intervals. As shown in the seventh power saving monitoring pattern 250*g*, monitoring opportunities may also be scheduled outside of onDurations. That is, FIG. 6B illustrates an example in which one or more monitoring opportunities of the power saving monitoring pattern 250*g* are concurrent with an inactivity timer interval after an onDuration interval of a corresponding scheduled active interval 210*a*. In this example, and as shown in the UE-state timeline 255*g*, the UE 105 monitors in accordance with the seventh power saving monitoring pattern 250*g* responsive to receiving a power saving signal 260*g* in the onDuration interval of the scheduled active time 210*a*. Upon receiving a DCI 240*e* (and corresponding data) during the on Duration, the UE may enter a low-power state at the end of the onDuration, and wake up to monitor again within the same scheduled active time 210*a* (i.e., during the corresponding IAT interval). The monitoring performed when no DCI 240/data arrives is shown with respect to the scheduled active time 210*b*. As shown, the UE 105 monitors the onDuration of scheduled active time 210*b* but since no DCI 240/data arrives to cause an IAT interval to extend the duration of the scheduled active time 210*b*, the UE 105 enters the low-power state at the end of the onDuration and does not wake up again for the next monitoring opportunity (i.e., scheduled after the onDuration of scheduled active interval 210*b*).

In some embodiments, the UE 105 is configured with different power saving monitoring patterns 250 having different measurement opportunity schedules that correspond to different DRX cycle lengths. Thus, a first set of one or more power saving monitoring patterns 250 may be available for use when the UE 105 is configured with a C-DRX configuration 230 having a first DRX cycle length, and a second set of one or more power saving monitoring patterns 250 available for use when the UE 105 is configured with a C-DRX configuration having a second DRX cycle length.

It should be noted that the examples of FIGS. 6A and 6B are representative examples, and the features of each may be used in combination. For example, power saving monitoring patterns 250 of different embodiments may be used with or without a timer, may have monitoring opportunities that occur every scheduled active duration 210 or skip one or more scheduled active durations 210, may respond to a power saving signal 260 that arrives only in one or more particular parts of scheduled active times 210 (e.g., in the onDuration, in the IAT duration, and/or any subset or combination thereof), may have long or short duty cycles, may occur periodically or aperiodically, and so on.

In some embodiments, in addition to the UE 105 being configured to respond to a power saving signal 260 as described herein, the UE 105 is also configured to respond to a WUS or similar signal in order to switch monitoring patterns 230, 250. In this regard, particular embodiments of PCT Application titled "Power Saving PDCCH Monitoring Techniques Equipment", PCT Application Number PCT/EP2020/056697 filing date 12 Mar. 2020 and having Client Reference P79454 WO1 (the entirety of which is hereby incorporated by reference in its entirety) are compatible with embodiments disclosed herein.

Although the examples discussed above and illustrated in FIG. 6A and FIG. 6B show GTS-SS-based monitoring opportunities that occur every onDuration of the C-DRX configuration, according to other embodiments the GTS-SS may instead schedule monitoring opportunities to occur in every N-th on Duration. In such embodiments, once the one or more monitoring opportunities corresponding to a GTS-SS within a given onDuration have elapsed, the UE 105 enters a low power state and refrains from monitoring until the Nth onDuration arrives (or an appropriate timer reinstates the monitoring-SS expires, as discussed above).

In yet other embodiments, the access node 110 may configure a GTS-SS with a periodicity longer than the configured onDuration of the C-DRX. In such embodiments, the search space periodicity can be, for example, a function of the DRX-cycle length. For example, the search space periodicity may be equal to T/X, where T is the DRX cycle length and X is an integer. In some particular embodiments, the search space periodicity may be longer than the IAT duration. Notwithstanding, the UE 105 may be configured to monitor in accordance with a corresponding monitoring pattern 230, 250 (i.e., any time that monitoring opportunities and the scheduled active time 210 of the C-DRX configuration 20 provide intersecting intervals).

In some embodiments, the access node 110 may configure the GTS-SS(s) in separate BWPs from the ones with monitoring-SS(s). According to one particular example, the access node 110 configures GTS-SSs in one or more BWPs that are narrower than the one or more BWPs in which the monitoring-SS(s) are configured.

In such some embodiments in which search spaces are activated and/or deactivated explicitly (e.g., using a DCI) or implicitly (e.g., upon reception of a scheduling DCI, expiration of a certain timer) the access node 110 may configure both GTS- and monitoring-SSs in the same BWPs, e.g. providing multiple SS configurations in the RRC configuration.

Additionally or alternatively, the access node 110 may associate one or more search spaces with different CORESETs (e.g., for robustness reasons), which in turn may be associated with different Transmission Configuration Indicator (TCI) states. Such embodiments may, for example, be implemented to enhance the robustness of receiving the power saving signal on one or more particular beams. The access node 110 may, in some particular embodiments, apply a higher aggregation level for a CORESET associated with a GTS-SS as compared to that provided in normal DCIs.

In some embodiments, the access node 110 may additionally or alternatively configure additional search spaces (e.g., such as by using a search space duration parameter) and/or may configure a number of different search spaces in a row to enable monitoring opportunities in accordance with respective GTS-SSs one after another. Moreover, the access node 110 configure monitoring opportunities according to a GTS-SS for one or more Scells or a group of Scells. In some embodiments, independent GTS-SS monitoring opportunities may be configured per SCell, or cross-controlled from other component carriers (e.g., in conjunction with the PCell, or another SCell).

In some embodiments, both short and long DRX cycles are configured in the UE 105, and the power saving signal can control whether the UE should go from short to long DRX cycle without having to go through a set of short DRX cycles. For example, the power saving signal can control the UE to go from short to long DRX cycles immediately upon receipt.

Notwithstanding the above, information sent from the access node 110 to the UE 105 (e.g., scheduling information, the power saving signal) may go undetected by the UE 105. For example, there may be a misalignment between the access node 110 and the UE 105, as the access node 110 may assume that the UE 105 is already in a low power state while the UE is actually monitoring. This may lead to the access node 110 scheduling data when the UE 105 is not monitoring PDCCH if the GTS-SS includes monitoring opportunities that are not included in the monitoring-SS. Accordingly, in some embodiments, the access node 110 configures the GTS-SS as a subset of monitoring-SS MOs (e.g., which may avoid the misalignment impact described above). In some related embodiments, the GTS-SS may continue for one or more slots after the DCI (or command) containing the power saving signal has been received, e.g., such that the GTS-SS does not end until after the ACK of the DCI carrying the power saving signal. Additionally or alternatively, an application delay may be applied when switching to a GTS-SS that covers the HARQ procedure of any data in the current monitoring-SS. That is, the access node 110 and the UE 105 are configured to switch to the GTS-SS after making sure that there no retransmission of the last PDSCH is required.

In some embodiments, the access node 110 may configure the UE 105 with a power saving monitoring pattern (e.g., a GTS-SS) in response to certain criteria being met. Such criteria may include, for example, when traffic to the UE 105 is sparse. For example, when a data burst is scheduled in onDuration and there is no further data during the following IAT duration, the access node 110 may configure the UE 105 with one or more power saving monitoring patterns that omit monitoring during the IAT duration and provide the UE 105 with a power saving option. The access node 110 may additionally or alternatively configure one or more power saving monitoring patterns when the UE 105 is not expected to receive information having a low latency requirement (e.g., mission-critical or real-time data requirements). Moreover, the access node 110 transmit a power saving signal even if it expects some data to arrive during the current onDuration (or active time) but at least not for a specific duration of time. Thus, the access node 110 may use the power saving signal to move the UE 105 to a sparser search space configuration based on the corresponding time duration within which the access node 110 expect not to schedule data for the UE 105.

Furthermore, the network (e.g., at or via the access node 110) may decide to configure a power saving monitoring pattern (e.g., a GTS-SS) responsive to an indication from the UE that saving power is needed and/or that latency criteria are secondary. For example, the UE 105 may indicate that it is in a critical power situation (e.g., through UE assistance information) and/or let the network know that additional latency is acceptable. An example of such an indication may include a Power Preference Indication provided on the LTE leg of a connection from the UE. In such an example, the eNB of the LTE leg could pass this information on to the gNB, in a dual connectivity (e.g., EN-DC) case. Alternatively, an Overheating Assistance indication could be used as an input to the gNB's decision for configuring the monitoring opportunities of one or more power saving monitoring patterns corresponding to respective one or more GTS-SSs. The UE 105 may also explicitly indicate its preference for being configured with a power saving monitoring pattern. In one such embodiment, the UE indicates this preference using a simple preference indicator. Alternatively, the UE may indicate this preference by indicating the desired search space/CORESET configuration per BWP or in the same BWP.

As mentioned above, the network (e.g., at or via the access node 110) may decide to configure a power saving monitoring pattern for one or more particular cells (e.g., for a Pcell, and/or one or more Scells). The criterion for a separate configuration on Scells may be responsive to one or more Scells operating in Frequency Range 2 (FR2) with significantly higher energy consumption (e.g., relative to Frequency Range 1 (FR1)) due to RF considerations and shorter slot length. In some embodiments, the UE 105 may be configured without power saving monitoring patterns on a Pcell in order to provide scheduling flexibility, and be configured with one or more short-duration power saving monitoring patterns on one or more Scells to allow scheduling on said Scell(s) with minimal PDCCH monitoring effort for the UE 105. For example, the access node 110 may configure power saving monitoring patterns only for Scells to reduce Scell-related energy consumption without affecting low-latency scheduling support on the Pcell.

In view of all of the above, embodiments of the present disclosure include the UE monitoring the monitoring-SS in the active BWP of the downlink and being configured with an appropriate GTS-SS. The network (i.e., access node 110 in this example) may determine whether or not to send a power saving signal to the UE 105 that configures the UE to switch from monitoring the downlink in accordance with the monitoring-SS to monitoring the downlink in accordance with the GTS-SS. For example, the access node 110 may decide to send the power saving signal in response to lacking data to be delivered, e.g., within a given timeframe, such as in the current ON duration (or at any other time in the active time, e.g. during the IAT duration following a data burst, or for a specific duration of time). In one particular example, the access node 110 sends a power saving signal responsive to the UE downlink buffer being empty. Additionally or alternatively, the access node 110 sends the power saving signal responsive to receiving a Buffer Status Report (BSR) from the UE 105 indicating that the UE 105 lacks pending uplink data. The access node 110 may additionally or alternatively send a power saving signal responsive to a lack of latency-sensitive data being expected to arrive (e.g., due to be absent from the UE buffer). According to some such embodiments, the data is considered latency-sensitive when transmission of the data during a subsequent onDuration would be expected to adversely impact QoS.

Furthermore, in some embodiments, the access node 110 may decide to transmit a power saving signal (or respective power saving signals) for each of a Pcell and one or more Scells. Alternatively, the access node 110 may decide to transmit a power saving signal (or respective power saving signals) for the Pcell and the Scells as a group. Other embodiments include deciding to transmit one or more power saving signals for any combination of Pcell, one or more Scells, and one or more Scell groups. The decision of whether or not to transmit the power saving signal may be based on a scheduler strategy of the access node 110. For example, the access node 110 may select a scheduler strategy that schedules transmission of a given data burst exclusively on the Pcell. Alternatively, the access node may select a scheduler strategy that utilizes the Pcell and one or more Scells for transmitting the data burst. For example, the access node 110 may select a scheduler strategy that utilizes the Pcell and one or more Scells responsive to buffer contents exceeding a threshold (e.g., in order to empty buffer's contents as quickly as possible). In contrast, the access node 110 may select the scheduler strategy that exclusively uses the Pcell in response to the buffer containing data below a threshold (e.g., small packets of bursty data). In some such embodiments, the access node 110 may prioritize UE 105 power saving.

In many embodiments, the power saving signal is a DCI configured to move the UE 105 between different downlink monitoring opportunity configurations (e.g., configurations that define a search space within which to monitor for a PDCCH). In some embodiments, each monitoring opportunity configuration may apply to monitoring within the same BWP, or may apply to monitoring of a different BWP. The power saving signal may be based on scheduling Das (which may include an additional bit field to indicate a monitoring opportunity configuration switch), e.g., DCI 1-1. In some embodiments, the access node 110 signals the UE 105 to activate or deactivate certain monitoring opportunity configurations (e.g., search space configurations) either explicitly or implicitly. In particular embodiments, the indication is in the form of a new DCI bit field, or reuses one or more existing DCI bitfields. As one particular example, the cross-slot bit field is reused to indicate a switch of monitoring opportunity configurations in Rel-16 networks. Alternatively, the UE 105 may be sent a scheduling DCI with a BWP change indication, e.g., to switch the UE 105 from monitoring a BWP in accordance with the monitoring-SS to another BWP in accordance with the GTS-SS.

According to some embodiments in which the UE 105 is further configured with one or more Scells, the access node 110 transmits the power saving signal directly in each Scell using one or more of the mechanisms described above. According to other such embodiments, the access node 110 employs cross-carrier scheduling or another type of cross-carrier DCI that allows the access node 110 to indicate to the UE 105 that it should change the monitoring opportunity configurations in the Scells. In particular, in some embodiments the access node 110 configures the UE 105 to monitor in accordance with a predefined GTS-SS across carriers, whereas in others, the predefined GTS-SS is to be applied within a same carrier.

According to some embodiments in which the power saving signal is a DCI in which no actual data is scheduled, the DCI may contain dummy PDSCH information, or may schedule a Channel State Information (CSI) report. Other embodiments include a power saving signal that triggers the UE 105 to switch downlink search space, and consequently result in the UE 105 using a monitoring opportunity configuration associated with the new search space.

In some embodiments, the access node 110 may follow-up the power saving signal transmission (e.g., a command to using a GTS-SS) with additional monitoring opportunity pattern (e.g., search space switching) commands. For example, a UE 105 switched to monitoring in accordance with a GTS-SS that does not cover the entire on-Duration (e.g., the first GTS-SS of FIG. 6A) may be switched to a monitoring-SS in the beginning of the next onDuration to enable full onDuration monitoring.

From the UE's perspective, one or more embodiments include the UE 105 receiving the above-discussed power saving signal while monitoring in accordance with, e.g., the monitoring-SS. Responsive to receiving the power saving signal (e.g., a DCI indicating that a monitoring opportunity configuration switch is appropriate), the UE 105 acts in accordance with that power saving signal. For example, responsive to the DCI comprising a BWP change command, the UE 105 may switch to a different BWP associated with a different PDCCH monitoring opportunity configuration (e.g., one of the GTS-SSs illustrated in FIG. 6A). Alternatively, responsive to the DCI comprising a command to switch search spaces within the same BWP, the UE 105 may change to a different PDCCH monitoring opportunity configuration without switching to a different BWP.

Furthermore, according to embodiments in which the power saving signal applies to both a Pcell and one or more Scells, the UE 105 applies the appropriate monitoring opportunity configuration change to the appropriate cells.

Responsive to the UE monitoring in accordance with a more extensive monitoring pattern (e.g., the monitoring-SS or other monitoring opportunity configuration that extends beyond the onDurations of the C-DRX configuration) and receiving the power saving signal, the UE 105 moves to a sparser search space and/or monitoring opportunity configuration that enables the UE 105 to reduce power consumption. In this regard, the UE 105 may use the intersection of search space monitoring opportunity definitions and C-DRX active time definitions to determine slot timings where PDCCH monitoring is required.

In one such example, responsive to the next PDCCH monitoring opportunity being outside the current C-DRX active time, the UE BWP timer expiring after the current C-DRX active time, and/or no other configured communication activities (e.g., a periodic CSI report, SRS transmission and so on) being expected, the UE 105 may start a DRX OFF duration until the next ON duration (e.g., to promptly enter a deeper sleep state). Alternatively, if the next monitoring opportunity is within the onDuration, but the time until the next monitoring opportunity is sufficiently soon for utilizing either light or deep sleep modes, the UE 105 may transition temporarily to an appropriate (e.g., deepest feasible) sleep state. For example, responsive to the next monitoring opportunity being longer than a threshold, the UE 105 may turn off a relatively large (e.g., all) amount of the circuitry used for receiver operations. Otherwise, the UE 105 may turn off less of that circuitry (e.g., only the Radio Frequency (RF) part).

Furthermore, as discussed above, the UE 105 may be configured to change BWPs responsive to expiration of a BWP timer. Accordingly, in some embodiments, responsive to expiration of such a BWP timer before the next power saving monitoring opportunity and before the end of a current active monitoring time, the UE 105 may decide to take an appropriate power saving measure based on the monitoring opportunity configuration of the BWP to which the UE 105 will change (or other BWP, e.g., the default BWP). Responsive to the first monitoring opportunity in the next BWP coming before the power saving monitoring opportunity in the current BWP, the UE 105 should nonetheless be ready to monitor the downlink in the next BWP, and in some cases, may still able to apply a power saving measure in between. Notwithstanding, in such embodiments in which the first monitoring opportunity in the next BWP arrives before the end of the current active time, it is recommended (but not necessarily required) that the UE 105 avoid moving directly to the DRX OFF duration.

Additionally, responsive to the power saving signal indicating a change in search space configuration within the current active time, or with a periodicity falling within the current active time, the UE 105 may skip monitoring occasions for a specific amount of time and/or to apply an appropriate power savings measure until the next monitoring opportunity. Examples of power savings measures that a UE 105 may take in accordance with one or more embodiments discussed herein include turning off RF circuitry or baseband processing.

In some particular embodiments, responsive to the power saving signal not being received in one or more Scells, the UE 105 may apply one or more of the mechanisms described above to save power in those Scells. For example, the UE 105 may be configured with cross-carrier scheduling (at least with respect to one or more power saving monitoring opportunity patterns/GTS-SSs) and responsive to no data being scheduled for one or more of the Scells, the UE 105 may select longer sleep durations (e.g., when the UE 105 does not have to monitor monitoring opportunities directly in the Scells).

The examples below illustrate the principles of power saving monitoring configuration signaling but are not meant to be an exhaustive list of possible setups. Additional or alternative examples may be constructed using similar principles, e.g., in view of the discussion above. In these examples, different approaches for designing the GTS-SS and the switching mechanisms are focused on. The monitoring-SS may generally be designed to perform dense (i.e., frequent) PDCCH monitoring irrespective of the C-DRX structure. For simplicity, the examples below assume that the monitoring-SS is configured to have a monitoring opportunity in every slot. It is also assumed that the BWP switching mechanism is used for invoking the desired search space. In other words, the monitoring-SS is configured in a first BWP and a power saving GTS-SS is configured in a second BWP.

According to one example, the UE 105 may be triggered to enter a low power state at an arbitrary instant during the active time of a C-DRX configuration using a GTS-SS that is configured with no monitoring opportunities. According to this example, under this search space configuration, the UE 105 will not need to perform any PDCCH monitoring. The first BWP is configured as the default BWP and the second BWP is configured with a timer exceeding the length of the IAT duration but not exceeding the length of the C-DRX period (or multiple periods, if the power saving signal is configured to have a longer-term effect). When the access node 110 determines that, during the monitoring-SS in the current onDuration or IAT duration, the power saving signal is to be sent, the access node 110 transmits a DCI that orders the UE 105 to switch to the second BWP and the GTS-SS. If the second BWP is set with a timer slightly longer than the IAT duration, the UE 105 will not monitor PDCCH until the beginning of the next onDuration, at which point the UE 105 will have returned to conventional operation. A similar effect may be achieved, in some alternative embodiments, by a short monitoring opportunity length and setting the periodicity as a very large value, e.g. 2560 slots, or by setting a large offset value. Thus, the UE 105 may effectively be scheduled not to encounter any monitoring opportunities before switching back to conventional operation.

According to another example, the UE 105 may be triggered to enter a low power state during the IAT duration after the nominal onDuration of a C-DRX configuration. According to this example, the GTS-SS is configured with monitoring opportunities that cover the onDuration segments (without any IAT extension). The first BWP is configured as the default BWP and the second BWP is configured with no timer. When the access node 110 determines that, under the monitoring-SS and during a running IAT, the power saving signal is to be sent, the access node 110 transmits a DCI that orders the UE 105 to switch to the second BWP and the GTS-SS. In response, the UE 105 refrains from monitoring the PDCCH until the beginning of the next onDuration, whereupon the UE 105 will commence monitoring for the duration of the subsequent onDurations. If any data is scheduled during any of the onDurations, a DCI is transmitted with a BWP switch command to switch to the regular monitoring-SS.

According to yet another example, a power saving signal that triggers the UE 105 to switch to a power saving monitoring pattern may be used in conjunction with an activation signal that indicates that the network would like the UE 105 to actively monitor a subsequent onDuration. According to this example, the GTS-SS is configured with monitoring opportunities that cover initial sections of onDuration segments (e.g., one or a few slots in each onDuration). The first BWP is configured as the default BWP and the second BWP is configured with no timer. When the access node 110 determines that, under the monitoring-SS and during a running IAT, the power saving signal is to be sent, the access node 110 transmits a DCI that orders the UE 105 to switch to the second BWP and the GTS-SS. In response, the UE 105 will not monitor for the PDCCH until the beginning of the coming onDuration, whereupon it will monitor the initial part, as well as the initial parts of following onDurations. If data is scheduled during a given onDuration, a DCI is transmitted with a BWP switch command to switch to the regular monitoring-SS, and at the end of the data burst(s), the UE 105 switches back to the GTS-SS (e.g., automatically or in response to receiving another power saving signal/DCI).

In view of all of the above, particular embodiments provide means that enable efficient UE power management by appropriate signaling and UE configuration. In particular, embodiments are enabled by transmitting a power saving signal to switch the UE 105 to a search space in which no PDCCH monitoring occasions are scheduled during the remainder of the current DRX onDuration.

Additional aspects relating to carrier aggregation, network decision points (e.g., made at or via the access node 110), and configuration are described above.

Particular embodiments configuring the UE 105 with a power saving search space with no monitoring occasions outside the nominal onDuration and with another search space having dense (i.e., frequent) monitoring opportunities. Responsive to no further data transmissions being expected during the current active time, a DCI is transmitted in the search space having dense monitoring opportunities. The UE 105 switches to the power saving search space in response to receiving the DCI.

In some embodiments, the switching of the search space is achieved using a BWP switching command in the DCI. In some such embodiments, the BWP to which the UE 105 is instructed to switch to is associated with a timer that reverts the UE 105 to dense/frequent monitoring opportunities of the previous search space upon expiration. The UE 105 may also be configured to switch back responsive to receiving a further DCI in a subsequent onDuration while monitoring in accordance with the power saving search space.

The monitoring occasions of the power saving monitoring pattern may, as shown in FIG. 6A and FIG. 6B for example, occupy the entire onDuration, an initial part of the onDuration, multiple parts of the onDuration, or may comprise no MOs.

Further embodiments of the present disclosure may share features that overlap in some or many respects with one or more of the embodiments discussed above. For example, embodiments of the present disclosure include a method 400 of monitoring a downlink performed by a UE 105 of a wireless communication network, as shown in FIG. 7. The method 400 comprises receiving, from an access node 110, information that configures the UE 105 with a power saving monitoring pattern 250 consisting of monitoring opportunities scheduled to occur only during scheduled onDuration intervals of a C-DRX configuration 220 of the UE 105 (block 410). The method 400 further comprises, responsive to receiving a power saving signal 260 from the access node 110, switching from monitoring the downlink in accordance with a C-DRX monitoring pattern 230 to monitoring the downlink in accordance with the power saving monitoring pattern 250 (block 420). Monitoring the downlink in accordance with the C-DRX monitoring pattern 230 comprises monitoring the downlink only throughout each of the scheduled onDuration intervals that occur and not more than a threshold duration subsequent to each (aspect 430). Monitoring the downlink in accordance with the power saving monitoring pattern 250 comprises monitoring the downlink only throughout the monitoring opportunities that occur (aspect 440).

Figure 8:
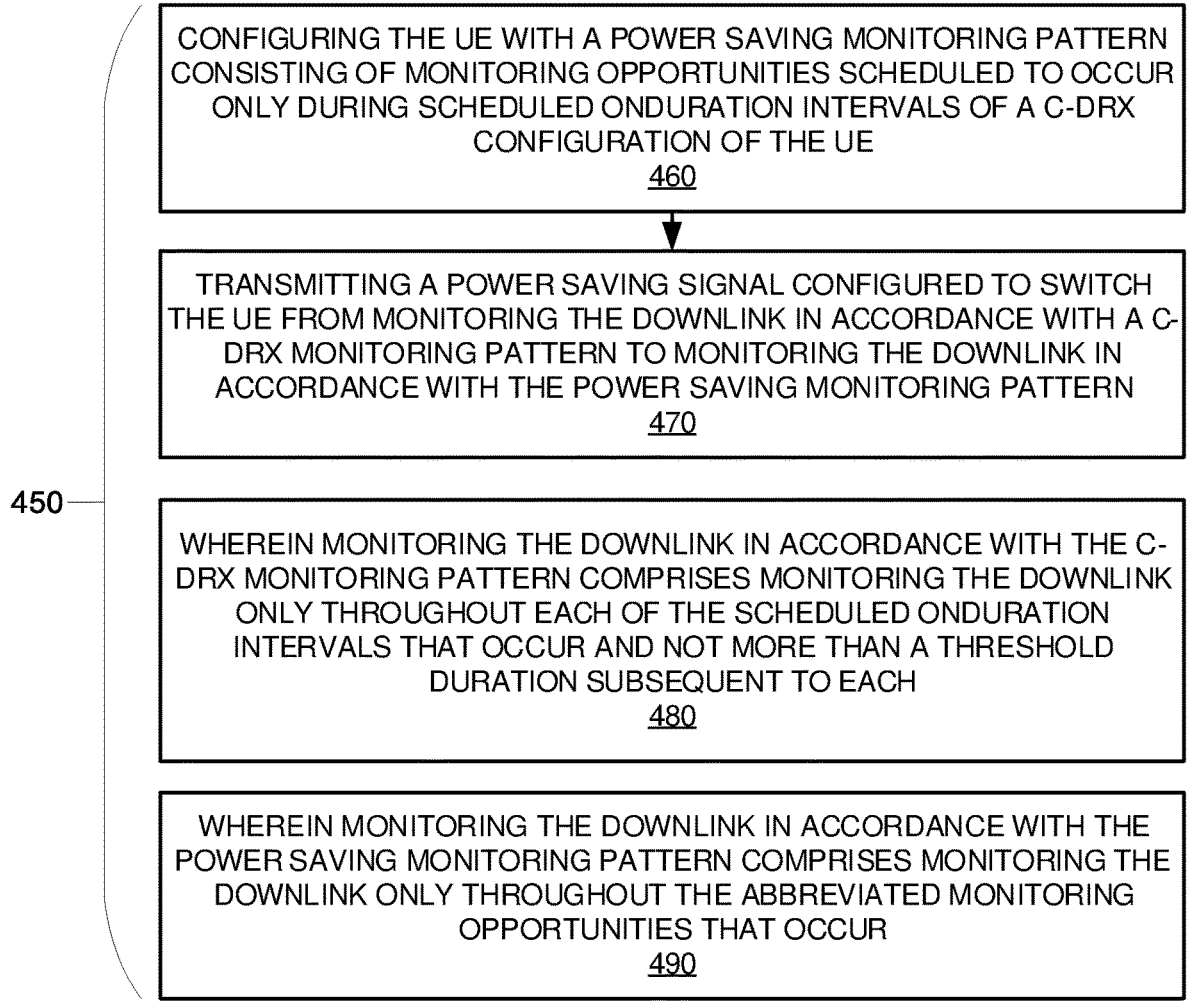
FIG. 8 is a flow diagram illustrating an example method implemented by an access node, according to one or more embodiments of the present disclosure.

Other embodiments of the present disclosure correspondingly include a method 450 of configuring a UE 105 to monitor a downlink performed by an access node 110 (e.g., a gNB) of a wireless communication network, as shown in FIG. 8. The method 450 comprises configuring the UE 105 with a power saving monitoring pattern 250 consisting of monitoring opportunities scheduled to occur only during scheduled onDuration intervals of a C-DRX configuration 220 of the UE 105 (block 460). The method 450 further comprises transmitting a power saving signal 260 configured to switch the UE 105 from monitoring the downlink in accordance with a C-DRX monitoring pattern 230 to monitoring the downlink in accordance with the power saving monitoring pattern 250 (block 470). Monitoring the downlink in accordance with the C-DRX monitoring pattern 230 comprises monitoring the downlink only throughout each of the scheduled onDuration intervals that occur and not more than a threshold duration subsequent to each (aspect 480). Monitoring the downlink in accordance with the power saving monitoring pattern 250 comprises monitoring the downlink only throughout the monitoring opportunities that occur (aspect 490).

It should be further noted that a UE 105 as described above may perform any of the processing described herein by implementing any functional means or units. In some embodiments, for example, the UE 105 comprises respective circuits configured to perform the steps shown in either FIG. 4 or FIG. 7. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory may store program code that, when executed by the one or more microprocessors, carries out the techniques described herein. That is, in some embodiments memory of the UE 105 contains instructions executable by processing circuitry whereby the UE 105 is configured to carry out the processing herein.

Figure 9:
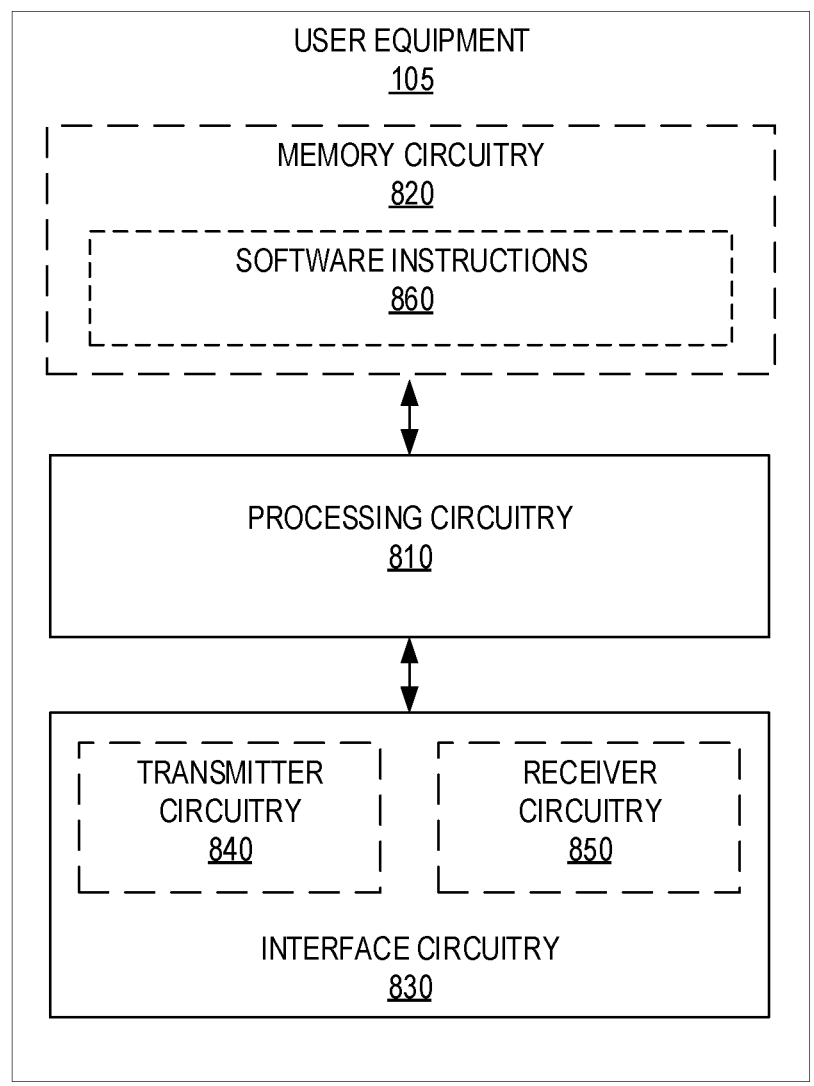
FIG. 9 is a schematic block diagram illustrating an example UE, according to one or more embodiments of the present disclosure.

FIG. 9 illustrates additional details of a UE 105 in accordance with one or more embodiments. The UE 105 comprises processing circuitry 810 and interface circuitry 830. The processing circuitry 810 is communicatively coupled to the interface circuitry 830, e.g., via one or more buses. In some embodiments, the UE 105 further comprises memory circuitry 820 that is communicatively coupled to the processing circuitry 810, e.g., via one or more buses. According to particular embodiments, the processing circuitry 810 is configured to perform one or more of the methods described herein (e.g., the method 300 illustrated in FIG. 4, the method 400 illustrated in FIG. 7).

The processing circuitry 810 of the UE 105 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 810 may be programmable hardware capable of executing software instructions 860 of a computer program stored in memory circuitry 820 whereby the processing circuitry 810 is configured. The memory circuitry 820 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 830 may be a controller hub configured to control the input and output (I/O) data paths of the UE 105. Such I/O data paths may include data paths for exchanging signals over a communications network, data paths for exchanging signals with a user, and/or data paths for exchanging data internally among components of the UE 105. For example, the interface circuitry 830 may comprise a transceiver configured to send and receive communication signals over one or more of a cellular network, Ethernet network, or optical network. The interface circuitry 830 may be implemented as a unitary physical component, or as a plurality of physical components that are contiguously or separately arranged, any of which may be communicatively coupled to any other, or may communicate with any other via the processing circuitry 810. For example, the interface circuitry 830 may comprise transmitter circuitry 840 configured to send communication signals over a communications network and receiver circuitry 850 configured to receive communication signals over the communications network. Other embodiments may include other permutations and/or arrangements of the above and/or their equivalents.

According to embodiments of the UE 105, the processing circuitry 810 is configured to, after receiving, from an access node 110, information that configures the UE 105 with a power saving monitoring pattern 250, receive 320 a power saving signal 260 from the access node 110. The processing circuitry is further configured to, responsive to receiving the power saving signal 260, switch from monitoring the downlink in accordance with a C-DRX monitoring pattern 230 to monitoring the downlink in accordance with the power saving monitoring pattern 250. For each of the monitoring patterns 230, 250, monitoring the downlink in accordance with the monitoring pattern 230, 250 comprises monitoring the downlink only when a monitoring opportunity of the monitoring pattern 230, 250 is concurrent with a scheduled active interval 210 of a C-DRX configuration 220 of the UE 105. For any C-DRX cycle of the C-DRX configuration 220, the monitoring of the downlink in accordance with the power saving monitoring pattern 250 has a shorter monitoring duration than the monitoring of the downlink in accordance with the C-DRX monitoring pattern 230.

According to other embodiments of the UE 105, the processing circuitry 810 is configured to receive, from an access node 110, information that configures the UE 105 with a power saving monitoring pattern 250 consisting of monitoring opportunities scheduled to occur only during scheduled onDuration intervals of a C-DRX configuration 220 of the UE 105. The processing circuitry 810 is further configured to, responsive to receiving a power saving signal 260 from the access node 110, switch from monitoring the downlink in accordance with a C-DRX monitoring pattern 230 to monitoring the downlink in accordance with the power saving monitoring pattern 250. Monitoring the downlink in accordance with the C-DRX monitoring pattern 230 comprises monitoring the downlink only throughout each of the scheduled onDuration intervals that occur and not more than a threshold duration subsequent to each. Monitoring the downlink in accordance with the power saving monitoring pattern 250 comprises monitoring the downlink only throughout the monitoring opportunities that occur.

Other embodiments of the present disclosure include corresponding computer programs. In one such embodiment, the computer program comprises instructions 860 which, when executed on processing circuitry 830 of a UE 105, cause the UE 105 to carry out any of the UE processing described above. A computer program in this regard may comprise one or more code modules corresponding to the steps, means, or units described above.

Embodiments further include a computer program product comprising program code portions for performing the steps of any of the embodiments herein when the computer program product is executed by a UE 105. This computer program product may be stored on a computer readable recording medium.

It should be further noted that an access node 110 as described above may perform any of the processing described herein by implementing any functional means or units. In one embodiment, for example, the access node 110 comprises respective circuits configured to perform the steps shown in FIG. 5 or FIG. 8. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory may store program code that, when executed by the one or more microprocessors, carries out the techniques described herein. That is, in some embodiments, memory of the access node 110 contains instructions executable by processing circuitry whereby the access node 110 is configured to carry out the processing herein.

Figure 10:
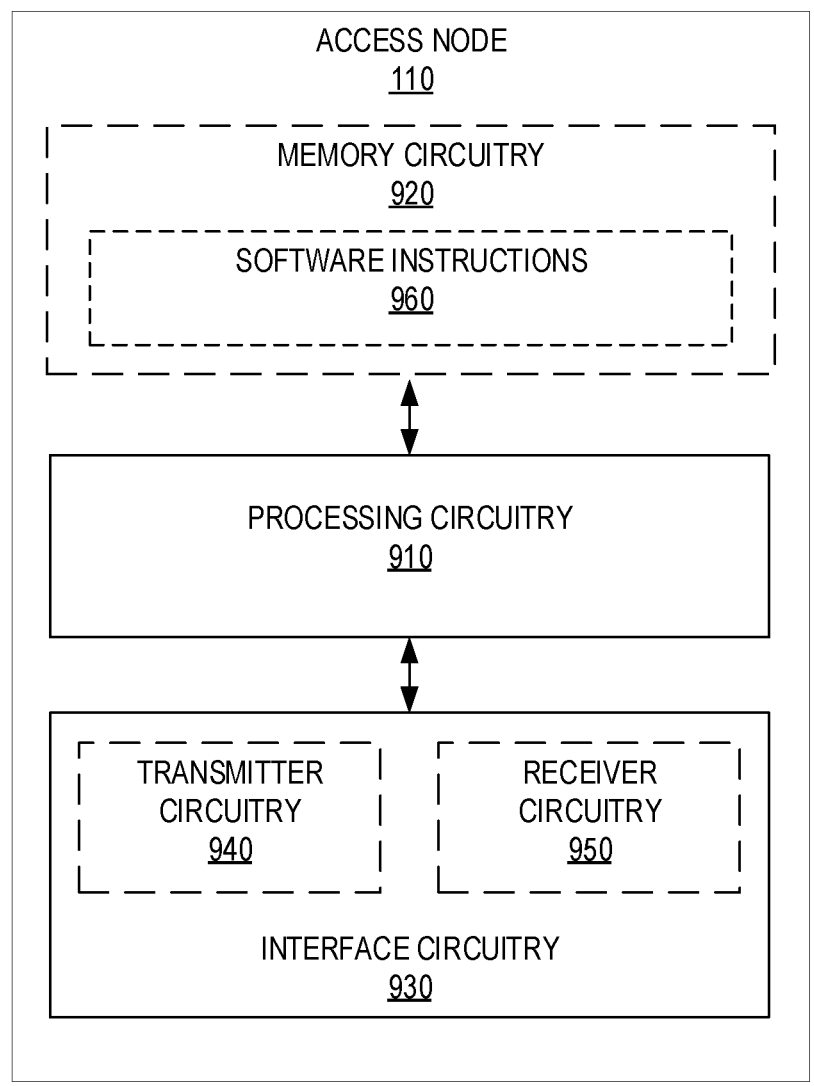
FIG. 10 is a schematic block diagram illustrating an example access node, according to one or more embodiments of the present disclosure.

FIG. 10 illustrates additional details of an access node 110 in accordance with one or more embodiments. The access node 110 comprises processing circuitry 910 and interface circuitry 930. The processing circuitry 910 is communicatively coupled to the interface circuitry 930, e.g., via one or more buses. In some embodiments, the access node 110 further comprises memory circuitry 920 that is communicatively coupled to the processing circuitry 910, e.g., via one or more buses. According to particular embodiments, the processing circuitry 910 is configured to perform one or more of the methods described herein (e.g., the method 350 illustrated in FIG. 5, the method 450 in FIG. 8).

The processing circuitry 910 of the access node 110 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may be programmable hardware capable of executing software instructions 960 of a computer program stored in memory circuitry 920 whereby the processing circuitry 910 is configured. The memory circuitry 920 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 930 may be a controller hub configured to control the input and output (I/O) data paths of the access node 110. Such I/O data paths may include data paths for exchanging signals over a communications network, data paths for exchanging signals with a user, and/or data paths for exchanging data internally among components of the access node 110. For example, the interface circuitry 930 may comprise a transceiver configured to send and receive communication signals over one or more of a cellular network, Ethernet network, or optical network. The interface circuitry 930 may be implemented as a unitary physical component, or as a plurality of physical components that are contiguously or separately arranged, any of which may be communicatively coupled to any other, or may communicate with any other via the processing circuitry 910. For example, the interface circuitry 930 may comprise transmitter circuitry 940 configured to send communication signals over a communications network and receiver circuitry 950 configured to receive communication signals over the communications network. Other embodiments may include other permutations and/or arrangements of the above and/or their equivalents.

According to embodiments of the access node 110, the processing circuitry 910 is configured to, after configuring the UE 105 with a power saving monitoring pattern 250, transmit a power saving signal 260 configured to switch the UE 105 from monitoring the downlink in accordance with a C-DRX monitoring pattern 230 to monitoring the downlink in accordance with the power saving monitoring pattern 250. For each of the monitoring patterns 230, 250, monitoring the downlink in accordance with the monitoring pattern 230, 250 comprises monitoring the downlink only when a monitoring opportunity of the monitoring pattern 230, 250 is concurrent with a scheduled active interval 210 of a C-DRX configuration 220 of the UE 105. For any C-DRX cycle of the C-DRX configuration 220, the monitoring of the downlink in accordance with the power saving monitoring pattern 250 has a shorter monitoring duration than the monitoring of the downlink in accordance with the C-DRX monitoring pattern 230.

According to other embodiments of the access node 110, the processing circuitry 910 is configured to configure the UE 105 with a power saving monitoring pattern 250 consisting of monitoring opportunities scheduled to occur only during scheduled onDuration intervals of a C-DRX configuration 220 of the UE 105. The processing circuitry 910 is further configured to transmit a power saving signal 260 configured to switch the UE 105 from monitoring the downlink in accordance with a C-DRX monitoring pattern 230 to monitoring the downlink in accordance with the power saving monitoring pattern 250. Monitoring the downlink in accordance with the C-DRX monitoring pattern 230 comprises monitoring the downlink only throughout each of the scheduled onDuration intervals that occur and not more than a threshold duration subsequent to each. Monitoring the downlink in accordance with the power saving monitoring pattern 250 comprises monitoring the downlink only throughout the monitoring opportunities that occur.

Other embodiments of the present disclosure include corresponding computer programs. In one such embodiment, the computer program comprises instructions which, when executed on processing circuitry 930 of an access node 110, cause the access node 110 to carry out any of the access node processing described above. A computer program in this regard may comprise one or more code modules corresponding to the means or units described above.

Embodiments further include a computer program product comprising program code portions for performing the steps of any of the embodiments herein when the computer program product is executed by an access node 110. This computer program product may be stored on a computer readable recording medium.

Embodiments further include a carrier containing one or more of the computer programs discussed above. This carrier may comprise one of an electronic signal, optical signal, radio signal, or computer readable storage medium.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not necessarily have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of monitoring a downlink using a plurality of monitoring patterns comprising a power saving monitoring pattern and a connected mode discontinuous reception (C-DRX) monitoring pattern, performed by a User Equipment (UE) of a wireless communication network, the method comprising:
    after receiving, from an access node, information that configures the UE with the power saving monitoring pattern, receiving a power saving signal from the access node; and
    responsive to receiving the power saving signal, switching from monitoring the downlink in accordance with the C-DRX monitoring pattern to monitoring the downlink in accordance with the power saving monitoring pattern;
    wherein, for each monitoring pattern of the plurality of monitoring patterns, monitoring the downlink in accordance with the monitoring pattern comprises monitoring the downlink only when a monitoring opportunity of the monitoring pattern is concurrent with a scheduled active interval of a C-DRX configuration of the UE; and
    wherein, for any C-DRX cycle of the C-DRX configuration, the monitoring of the downlink in accordance with the power saving monitoring pattern has a shorter monitoring duration than the monitoring of the downlink in accordance with the C-DRX monitoring pattern.

2. The method of claim 1, wherein monitoring opportunities of the power saving monitoring pattern are concurrent with scheduled active intervals of the C-DRX configuration exclusively during onDuration intervals of the scheduled active intervals.

3. The method of claim 1, wherein at least one of the monitoring opportunities of the power saving monitoring pattern is concurrent with an inactivity timer interval after an onDuration interval of a corresponding scheduled active interval.

4. The method of claim 1, further comprising, in response to the power saving signal, switching back to monitoring the downlink in accordance with the C-DRX monitoring pattern monitoring pattern upon expiration of a timer.

5. The method of claim 1, further comprising, responsive to receiving a further signal from the access node after receiving the power saving signal, switching back to monitoring the downlink in accordance with the C-DRX monitoring pattern.

6. The method of claim 1, wherein the information that configures the UE with the power saving monitoring pattern further configures the UE with the power saving monitoring pattern for use with a Primary Cell (PCell) and/or a Secondary Cell (SCell).

7. The method of claim 6, further comprising, for each of the PCell and the SCell, receiving other information configuring the UE with a corresponding set of two or more power saving monitoring patterns, one of the sets comprising the power saving monitoring pattern and the other of the sets comprising the different power saving monitoring pattern.

8. A method of configuring a User Equipment (UE) to monitor a downlink using a plurality of monitoring patterns comprising a power saving monitoring pattern and a connected mode discontinuous reception (C-DRX) monitoring pattern, performed by an access node of a wireless communication network, the method comprising:
after configuring the UE with the power saving monitoring pattern, transmitting a power saving signal configured to switch the UE from monitoring the downlink in accordance with the C-DRX monitoring pattern to monitoring the downlink in accordance with the power saving monitoring pattern;
wherein, for each monitoring pattern of the plurality of monitoring patterns, monitoring the downlink in accordance with the monitoring pattern comprises monitoring the downlink only when a monitoring opportunity of the monitoring pattern is concurrent with a scheduled active interval of a C-DRX configuration of the UE;
wherein, for any C-DRX cycle of the C-DRX configuration, the monitoring of the downlink in accordance with the power saving monitoring pattern has a shorter monitoring duration than the monitoring of the downlink in accordance with the C-DRX monitoring pattern.

9. The method of claim 8, wherein monitoring opportunities of the power saving monitoring pattern are concurrent with scheduled active intervals of the C-DRX configuration exclusively during onDuration intervals of the scheduled active intervals.

10. The method of claim 8, wherein at least one of the monitoring opportunities of the power saving monitoring pattern is concurrent with an inactivity timer interval after an onDuration interval of a corresponding scheduled active interval.

11. The method of claim 8, wherein the power saving signal is further configured to switch the UE back to monitoring the downlink in accordance with the C-DRX monitoring pattern upon expiration of a timer.

12. The method of claim 8, further comprising transmitting, after the power saving signal, a further signal configured to switch the UE back to monitoring the downlink in accordance with the C-DRX monitoring pattern.

13. The method of claim 8, wherein configuring the UE with the power saving monitoring pattern comprises configuring the UE with the power saving monitoring pattern for use with a Primary Cell (PCell) and/or a Secondary Cell (SCell).

14. A user equipment (UE) for monitoring a downlink using a plurality of monitoring patterns comprising a power saving monitoring pattern and a connected mode discontinuous reception (C-DRX) monitoring pattern, the UE comprising:
interface circuitry configured to exchange signaling with an access node;
processing circuitry configured to:
after receiving, from the access node via the interface circuitry, information that configures the UE with the power saving monitoring pattern, receive a power saving signal from the access node via the interface circuitry;
responsive to receiving the power saving signal, switch from using the interface circuitry to monitor the downlink in accordance with the C-DRX monitoring pattern to using the interface circuitry to monitor the downlink in accordance with the power saving monitoring pattern;
wherein, for each monitoring pattern of the plurality of monitoring patterns, monitoring the downlink in accordance with the monitoring pattern comprises monitoring the downlink only when a monitoring opportunity of the monitoring pattern is concurrent with a scheduled active interval of a C-DRX configuration of the UE;
wherein, for any C-DRX cycle of the C-DRX configuration, the monitoring of the downlink in accordance with the power saving monitoring pattern has a shorter monitoring duration than the monitoring of the downlink in accordance with the C-DRX monitoring pattern.

15. The UE of claim 14, wherein monitoring opportunities of the power saving monitoring pattern are concurrent with scheduled active intervals of the C-DRX configuration exclusively during onDuration intervals of the scheduled active intervals.

16. The UE of claim 14, wherein at least one of the monitoring opportunities of the power saving monitoring pattern is concurrent with an inactivity timer interval after an onDuration interval of a corresponding scheduled active interval.

17. The UE of claim 14, wherein the processing circuitry is further configured to, in response to the power saving signal, switch back to monitoring the downlink in accordance with the C-DRX monitoring pattern upon expiration of a timer.

18. The UE of claim 14, wherein the processing circuitry is further configured to, responsive to receiving a further signal from the access node after receiving the power saving signal, switch back to monitoring the downlink in accordance with the C-DRX monitoring pattern.

19. The UE of claim 14, wherein the information that configures the UE with the power saving monitoring pattern further configures the UE with the power saving monitoring pattern for use with a Primary Cell (PCell) and/or a Secondary Cell (SCell).

20. The UE of claim 19, wherein the processing circuitry is further configured to, for each of the PCell and the SCell, receive other information configuring the UE with a corresponding set of two or more power saving monitoring patterns, one of the sets comprising the power saving monitoring pattern and the other of the sets comprising the different power saving monitoring pattern.

21. An access node for configuring a User Equipment (UE) to monitor a downlink using a plurality of monitoring patterns comprising a power saving monitoring pattern and a connected mode discontinuous reception (C-DRX) monitoring pattern, the access node comprising:
    interface circuitry configured to exchange signaling with the UE;
    processing circuitry configured to:
        after configuring the UE with the power saving monitoring pattern, transmit, via the interface circuitry, a power saving signal configured to switch the UE from monitoring the downlink in accordance with the C-DRX monitoring pattern to monitoring the downlink in accordance with the power saving monitoring pattern;
    wherein, for each monitoring pattern of the plurality of monitoring patterns, monitoring the downlink in accordance with the monitoring pattern comprises monitoring the downlink only when a monitoring opportunity of the monitoring pattern is concurrent with a scheduled active interval of a C-DRX configuration of the UE;
    wherein, for any C-DRX cycle of the C-DRX configuration, the monitoring of the downlink in accordance with the power saving monitoring pattern has a shorter monitoring duration than the monitoring of the downlink in accordance with the C-DRX monitoring pattern.

22. The access node of claim 21, wherein monitoring opportunities of the power saving monitoring pattern are concurrent with scheduled active intervals of the C-DRX configuration exclusively during onDuration intervals of the scheduled active intervals.

23. The access node of claim 21, wherein at least one of the monitoring opportunities of the power saving monitoring pattern is concurrent with an inactivity timer interval after an onDuration interval of a corresponding scheduled active interval.

24. The access node of claim 21, wherein the power saving signal is further configured to switch the UE back to monitoring the downlink in accordance with the C-DRX monitoring pattern upon expiration of a timer.

25. The access node of claim 21, wherein the processing circuitry is further configured to transmit, after the power saving signal, a further signal configured to switch the UE back to monitoring the downlink in accordance with the C-DRX monitoring pattern.

26. The access node of claim 21, wherein to configure the UE with the power saving monitoring pattern, the processing circuitry is configured to configure the UE with the power saving monitoring pattern for use with a Primary Cell (PCell) and/or a Secondary Cell (SCell).

\* \* \* \* \*